US009977589B2

(12) United States Patent
Min et al.

(10) Patent No.: US 9,977,589 B2
(45) Date of Patent: May 22, 2018

(54) MOBILE TERMINAL AND METHOD OF CONTROLLING THE SAME

(71) Applicant: LG ELECTRONICS INC., Seoul (KR)

(72) Inventors: Jihye Min, Seoul (KR); Juhee Jang, Seoul (KR); Yongdeok Lee, Seoul (KR); Kwonhan Bae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 268 days.

(21) Appl. No.: 14/311,063

(22) Filed: Jun. 20, 2014

(65) Prior Publication Data

US 2015/0268811 A1 Sep. 24, 2015

(30) Foreign Application Priority Data

Mar. 20, 2014 (KR) .................. 10-2014-0032974

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0481* (2013.01); *G06F 3/0483* (2013.01); *G06F 2203/04808* (2013.01)

(58) Field of Classification Search
CPC .... G06F 3/0488; G06F 3/0481; G06F 3/0483; G06F 2203/04808
See application file for complete search history.

(56) References Cited

U.S. PATENT DOCUMENTS 9,063,647 B2* 6/2015 Zotov .................. G06F 3/0416
2002/0160817 A1* 10/2002 Salmimaa .......... G06F 3/04817
455/566

(Continued)

FOREIGN PATENT DOCUMENTS

EP 2584440 10/2011
EP 2664983 11/2013

OTHER PUBLICATIONS

Jason Rich, "Five Ways to Personalize Your iPhone or iPad With iOS 7", published to web on Nov. 7, 2013 at http://www.informit.com/articles/article.aspx?p=2156109, retrieved May 30, 2017.*

(Continued)

*Primary Examiner* — Shourjo Dasgupta
(74) *Attorney, Agent, or Firm* — Lee, Hong, Degerman, Kang & Waimey

(57) ABSTRACT

Disclosed is a mobile terminal which provides a plurality of home screen pages where application-related graphic objects have been arranged. The mobile terminal includes: a display unit configured to output one of the plurality of home screen pages; a sensing unit configured to sense a touch to the display unit, in a state where one of the plurality of home screen pages has been output; and a controller configured to output graphic objects arranged on the plurality of home screen pages to a single page, in response to a preset type of touch to the display unit, wherein at least one graphic object arranged on said one home screen page, and at least one graphic object arranged on one or more other home screen pages rather than said one home screen page among the plurality of home screen pages are together output to the single page.

15 Claims, 32 Drawing Sheets

(51) Int. Cl.
*G06F 3/0481* (2013.01)
*G06F 3/0483* (2013.01)

(56) References Cited

U.S. PATENT DOCUMENTS

| | | | | |
|---|---|---|---|---|
| 2003/0063128 | A1* | 4/2003 | Salmimaa | G06F 3/04817 |
| | | | | 715/810 |
| 2003/0189597 | A1* | 10/2003 | Anderson | G06F 3/0481 |
| | | | | 715/778 |
| 2007/0130541 | A1* | 6/2007 | Louch | G06F 3/04817 |
| | | | | 715/804 |
| 2008/0104535 | A1* | 5/2008 | DeLine | G06F 3/0483 |
| | | | | 715/785 |
| 2009/0204925 | A1* | 8/2009 | Bhat | G06F 1/1626 |
| | | | | 715/778 |
| 2010/0299598 | A1* | 11/2010 | Shin | G06F 3/0488 |
| | | | | 715/702 |
| 2011/0047573 | A1* | 2/2011 | Onogi | H04N 5/44543 |
| | | | | 725/41 |
| 2012/0015693 | A1 | 1/2012 | Choi et al. | |
| 2013/0096819 | A1* | 4/2013 | Tarnok | G01C 21/00 |
| | | | | 701/428 |
| 2013/0135234 | A1 | 5/2013 | Hisano et al. | |
| 2013/0198663 | A1* | 8/2013 | Matas | G06T 11/60 |
| | | | | 715/765 |
| 2013/0290887 | A1* | 10/2013 | Sun | G06F 3/0482 |
| | | | | 715/769 |
| 2013/0305189 | A1 | 11/2013 | Kim | |
| 2013/0309648 | A1* | 11/2013 | Park | G09B 5/00 |
| | | | | 434/350 |
| 2014/0055376 | A1* | 2/2014 | Baek | G06F 3/0488 |
| | | | | 345/173 |
| 2014/0189587 | A1* | 7/2014 | Nam | H04N 21/44222 |
| | | | | 715/810 |
| 2014/0372932 | A1* | 12/2014 | Rutherford | G06F 9/4443 |
| | | | | 715/776 |
| 2015/0065107 | A1* | 3/2015 | Dave | H04M 1/72572 |
| | | | | 455/418 |

OTHER PUBLICATIONS

"Introduction to Windows 7," XP055151814, Jul. 2010, 13 pages.
Agarawala, et al., "Keepin It Real: Pushing the Desktop Metaphor with Physics, Piles, and the Pen," Conference Proceedings, CHI 2006, Conference on Human Factors in Computing Systems: Montreal, Quebec, Canada, Apr. 2006, XP002566457, 10 pages.
European Patent Office Application Serial No. 14002164.3, Search Report dated Nov. 21, 2014, 11 pages.
European Patent Office Application Serial No. 14002164.3, Office Action dated Jul. 25, 2017, 12 pages.

* cited by examiner

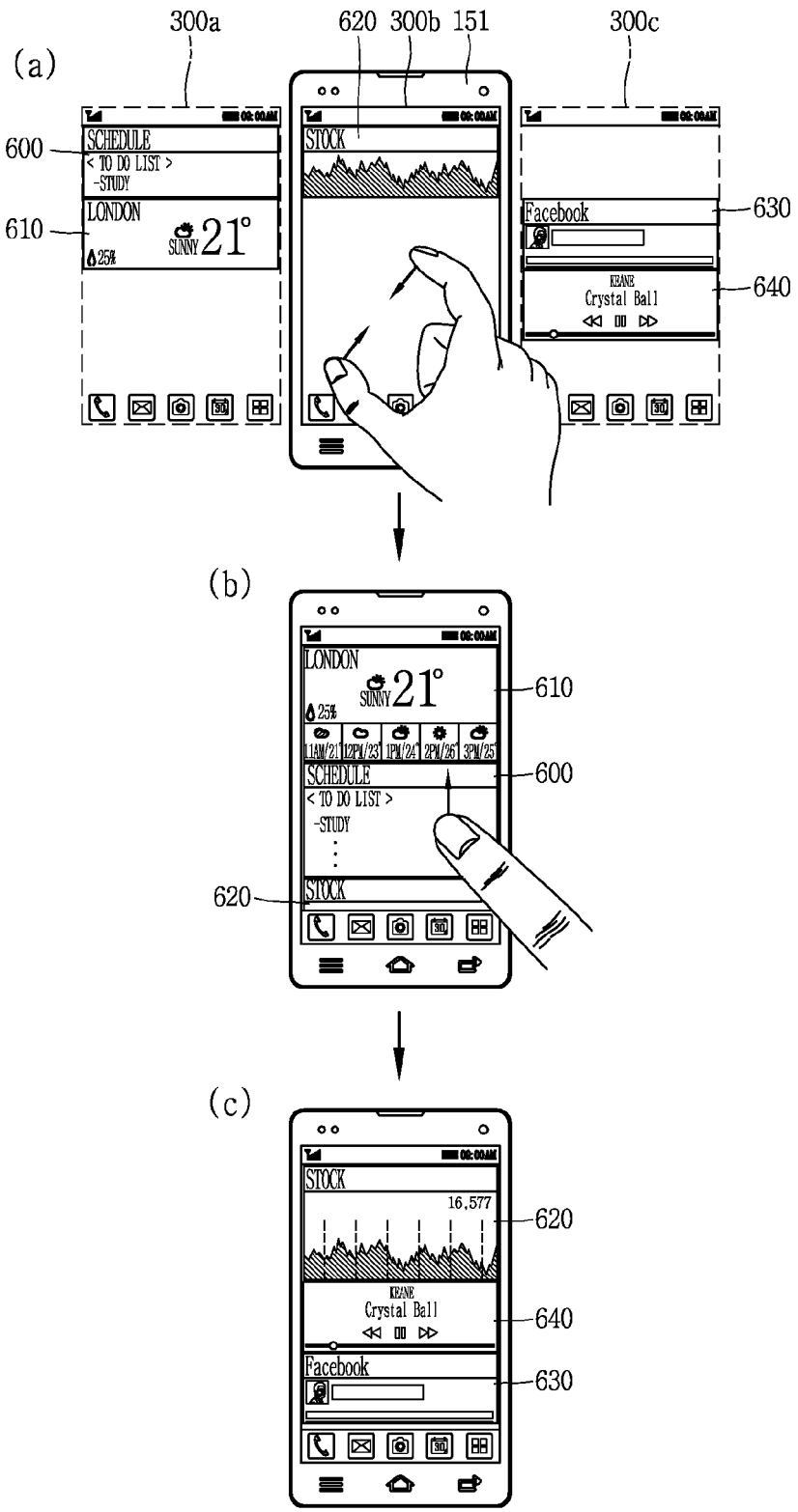

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2014-0032974, filed on Mar. 20, 2014, the contents of which is incorporated by reference herein in its entirety.

BACKGROUND OF THE DISCLOSURE

1. Field of the Disclosure

The present disclosure relates to a mobile terminal capable of allowing a user to view graphic objects arranged on a plurality of home screen pages at a glance, and a control method thereof.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a mobile terminal is being developed to have a larger display unit as a touch input can be applied to the display unit. As the size of the display unit is increased, a user may have a difficulty in searching for his or her desired information, because various types of information has been output to the display unit in a dispersed manner. Accordingly, a method capable of displaying complicated and various information in an assembled manner is required.

SUMMARY OF THE DISCLOSURE

Therefore, an aspect of the detailed description is to provide a method capable of providing a user with a function to view graphic objects arranged on a plurality of home screen pages at a glance.

Another aspect of the detailed description is to provide a method capable of performing various functions related to graphic objects arranged on a plurality of home screen pages, on a single page.

To achieve these and other advantages and in accordance with the purpose of this specification, as embodied and broadly described herein, there is provided a mobile terminal which provides a plurality of home screen pages where application-related graphic objects have been arranged, the mobile terminal including: a display unit configured to output one of the plurality of home screen pages; a sensing unit configured to sense a touch to the display unit, in a state where one of the plurality of home screen pages has been output; and a controller configured to output graphic objects arranged on the plurality of home screen pages to a single page, in response to a preset type of touch to the display unit, wherein at least one graphic object arranged on said one home screen page, and at least one graphic object arranged on one or more other home screen pages rather than said one home screen page among the plurality of home screen pages are together output to the single page.

In an embodiment, if a touch different from the preset type of touch is applied to the display unit, the controller may not output the graphic objects output to the single page to the display unit any longer, but re-output said one home screen page which has been output before the preset type of touch is applied.

In an embodiment, upon input of the preset type of touch, the controller may output a selection screen inquiring a user whether to select a function for outputting thumbnail images indicating the plurality of home screen pages, or a function for outputting the graphic objects arranged on the plurality of home screen pages to a single page. Then the controller may execute one of the two functions which is selected by the user.

In an embodiment, the controller may output, to one region of an execution screen for the one function selected by the user, a graphic object indicating conversion of the executed one function to another function.

In an embodiment, the graphic objects displayed on the single page may have different sizes based on a preset condition.

In an embodiment, the preset condition may be a user's usage pattern with respect to graphic objects, and the controller may determine a size of the graphic objects according to the user's usage pattern with respect to the respective graphic objects.

In an embodiment, the user's usage pattern may be set by time, and the controller may determine a size of the graphic objects based on a time zone when the preset type of touch has been sensed.

In an embodiment, the preset condition may be attribute information of the graphic objects, and the controller may determine a size of the graphic objects according to the attribute information.

In an embodiment, the controller may determine a display position of the graphic objects on the single page, based on a type of the graphic objects.

In an embodiment, if there exist a plurality of graphic objects related to the same application, the controller may display the plurality of graphic objects on one region of the single page, in an overlapping manner.

In an embodiment, if a preset type of touch is applied to the overlapped graphic objects, in a state where content of one graphic object among the plurality of overlapped graphic objects has been displayed, the controller may display content of another graphic object different from said one graphic object.

In an embodiment, if content of said another graphic object is displayed, the controller may not display content of said one graphic object any longer.

In an embodiment, if touch inputs applied to at least two points are sensed, the controller may detect a type of a graphic object displayed on the first touch point, and the controller may output, to the single page, one or more graphic objects having the same type as the detected graphic object among the graphic objects arranged on the plurality of home screen pages.

In an embodiment, the controller may not output, to the single page, one or more graphic objects having a different type from the detected graphic object among the graphic objects arranged on the plurality of home screen pages.

In an embodiment, at least one widget and icon may be displayed on the single page, and the controller may activate an edition mode where a display type of said at least one widget and icon on the display unit is changeable, in response to a user's selection in a state where the single page has been output to the display unit.

In an embodiment, the controller may change a display type of said at least one widget and icon, in response to a touch to the display unit in an activated state of the edition mode.

In an embodiment, if the touch is applied to a first region, the controller may change a display type of said at least one widget and icon, into a first type corresponding to the touch applied to the first region. If the touch is applied to a second region different from the first region, the controller may change a display type of said at least one widget and icon, into a second type corresponding to the touch applied to the second region.

In an embodiment, if a preset type of touch is applied to the display unit after the display type has been changed in response to the touch, the controller may deactivate the edition mode, and may re-output said one home screen page to the display unit. The graphic objects arranged on said one home screen page may have the changed display type.

To achieve these and other advantages and in accordance with the purpose of this specification, as embodied and broadly described herein, there is also provided a method of controlling a mobile terminal which provides a plurality of home screen pages where application-related graphic objects have been arranged, the method including: outputting one home screen page among the plurality of home screen pages; sensing a touch to the display unit, in a state where said one home screen page has been output; and outputting graphic objects arranged on the plurality of home screen pages, to a single page, in response to a preset type of touch to the display unit, wherein at least one graphic object arranged on said one home screen page, and at least one graphic object arranged on one or more other home screen pages rather than said one home screen page among the plurality of home screen pages are together output to the single page.

In an embodiment, said one home screen page may be re-output to the display unit, in response to input of a touch different from the preset type of touch, in a state where the single page has been output to the display unit.

The present invention may have the following advantages.

Firstly, the present invention may provide a function which allows a user to view graphic objects dispersed on a plurality of home screen pages, at a glance, by outputting the graphic objects arranged on the plurality of home screen pages to a single page. Accordingly, a user can search for his or her desired graphic object through simple manipulation, without directly entering a home screen page where the desired graphic object has been displayed.

Secondly, the present invention may provide a method capable of displaying graphic objects arranged on a plurality of home screen pages on a single page, and capable of editing the graphic objects on the single page. Accordingly, a user can edit graphic objects arranged on a plurality of home screen pages at one time, in a style of the same theme.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 7A and 7B are conceptual views illustrating a method of displaying graphic objects arranged on a plurality of home screen pages on a single page, in a case where the number of the graphic objects is large;

DETAILED DESCRIPTION OF THE DISCLOSURE

Figure 1A:
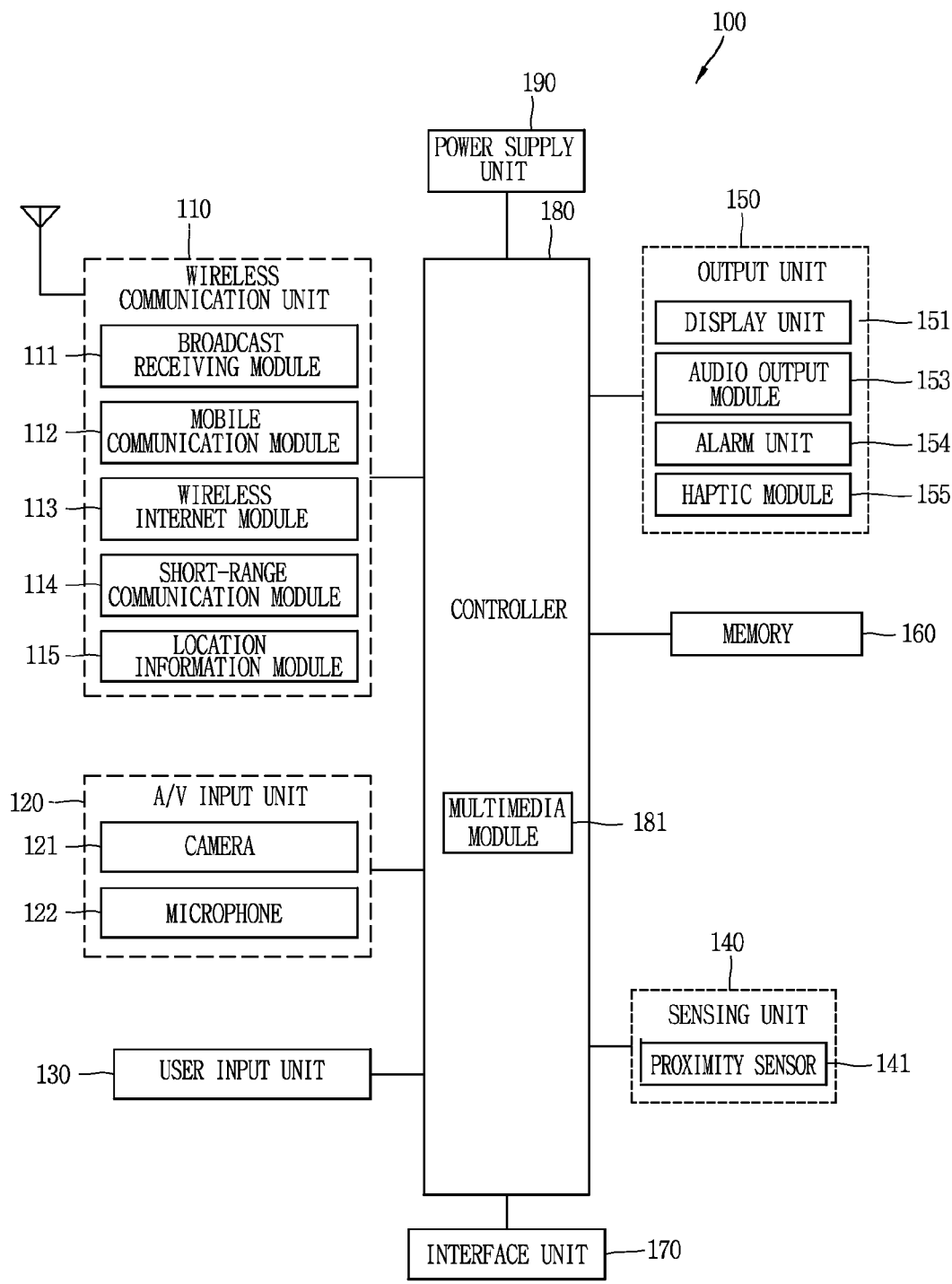
FIG. 1A is a block diagram for explaining a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
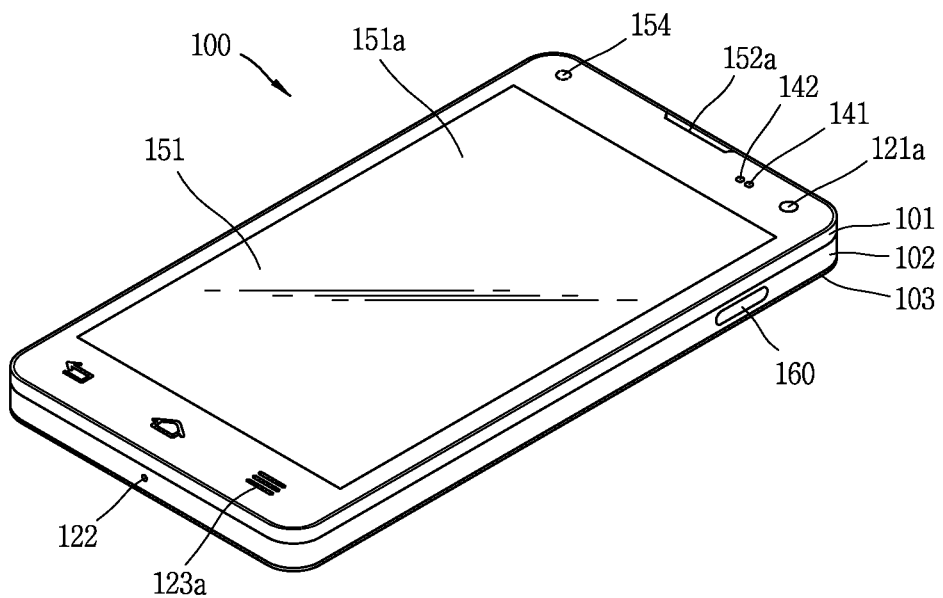
FIGS. 1B and 1C are conceptual views of a mobile terminal viewed from different directions according to an embodiment of the present invention.
Figure 1C:
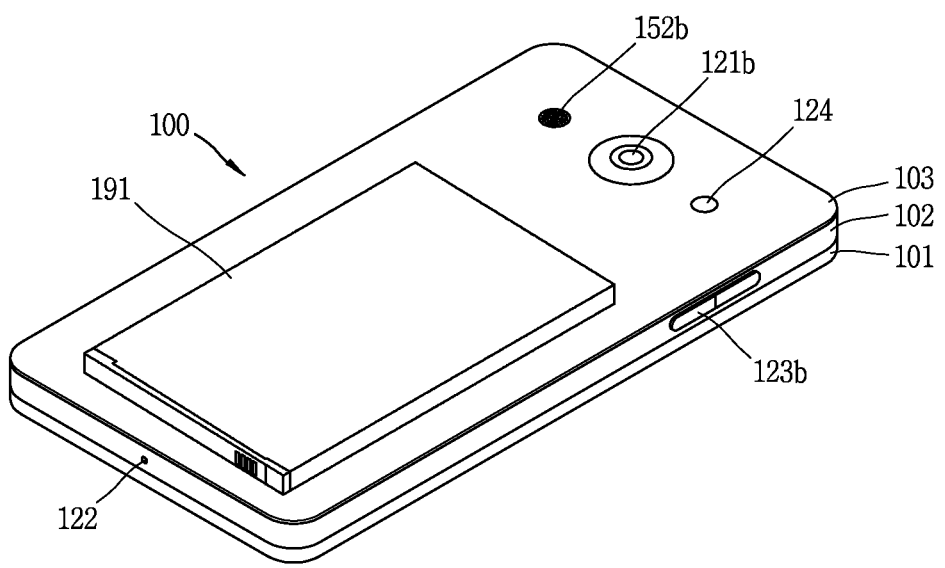

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Preferred embodiments of a method of controlling the above mobile terminal will be explained in more detail with reference to the attached drawings.

The present invention relates to a mobile terminal capable of outputting graphic objects arranged on a plurality of home screen pages, to a single page, and a control method thereof.

The present invention may be executed by a launcher application which should be requisitely executed in order to boot up and perform functions of a mobile terminal, or may be executed by the controller 180 itself.

In a case where the present invention is executed by a launcher application, the launcher application may be an application set as a basic program when the mobile terminal is released from a factory, or may be an application installed at the mobile terminal by a user's selection.

In a case where the launcher application is an application installed at the mobile terminal by a user's selection, the user may download the launcher application through a wireless communication unit. The user may use a web site where applications can be downloaded. Such web site may be called an application market.

In a case where a launcher application installed at the mobile terminal by a user's selection is driven, the original launcher application may not be executed any longer. The reason is in order to prevent collision between the launcher applications.

In a case where a plurality of launcher applications are installed, a user may select one of the launcher applications.

Hereinafter, will be explained a case where the present invention is executed by the controller 180 of the mobile terminal. However, the present invention may be also performed by using a launcher application, in the same manner as in the case of using the controller 180.

Figure 2:
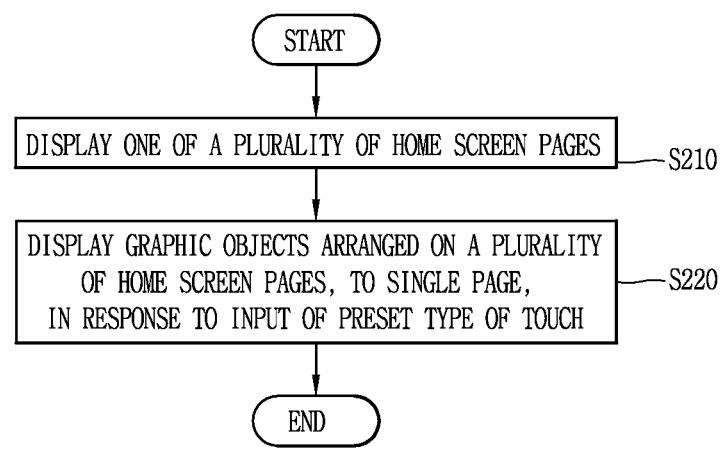
FIG. 2 is a flowchart illustrating a method of outputting graphic objects arranged on a plurality of home screen pages, to a single page in a mobile terminal according to an embodiment of the present invention.
Figure 3:
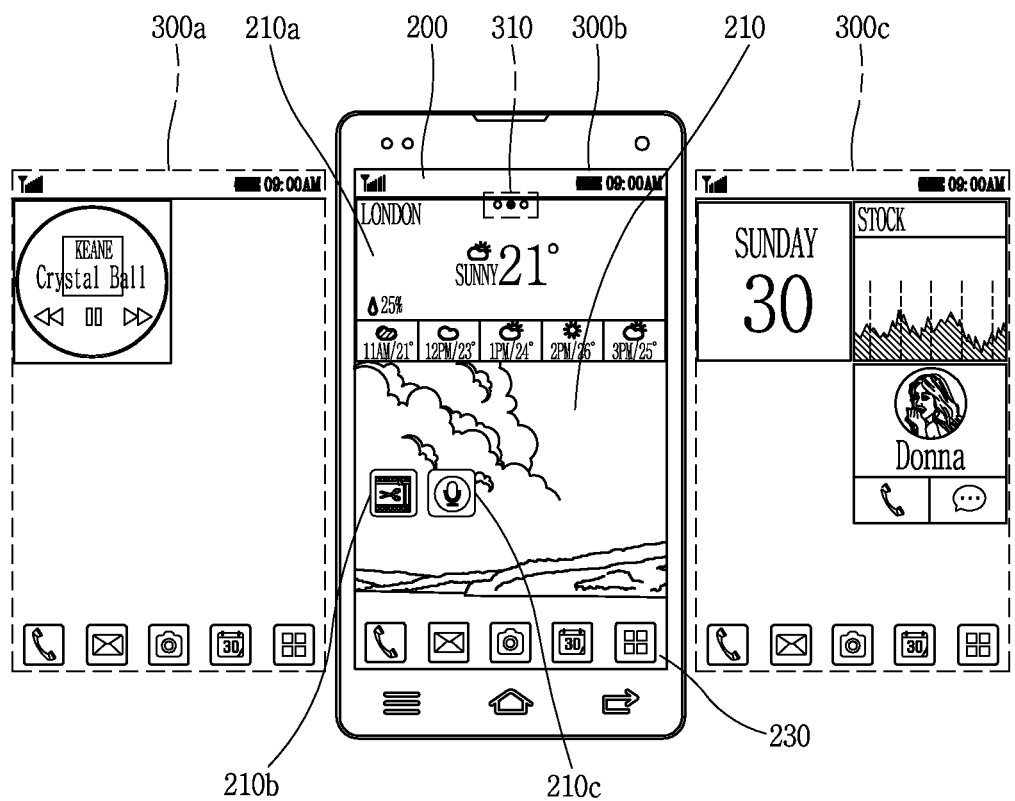
FIG. 3 is a conceptual view illustrating home screen pages according to the present invention.
Figure 4A:
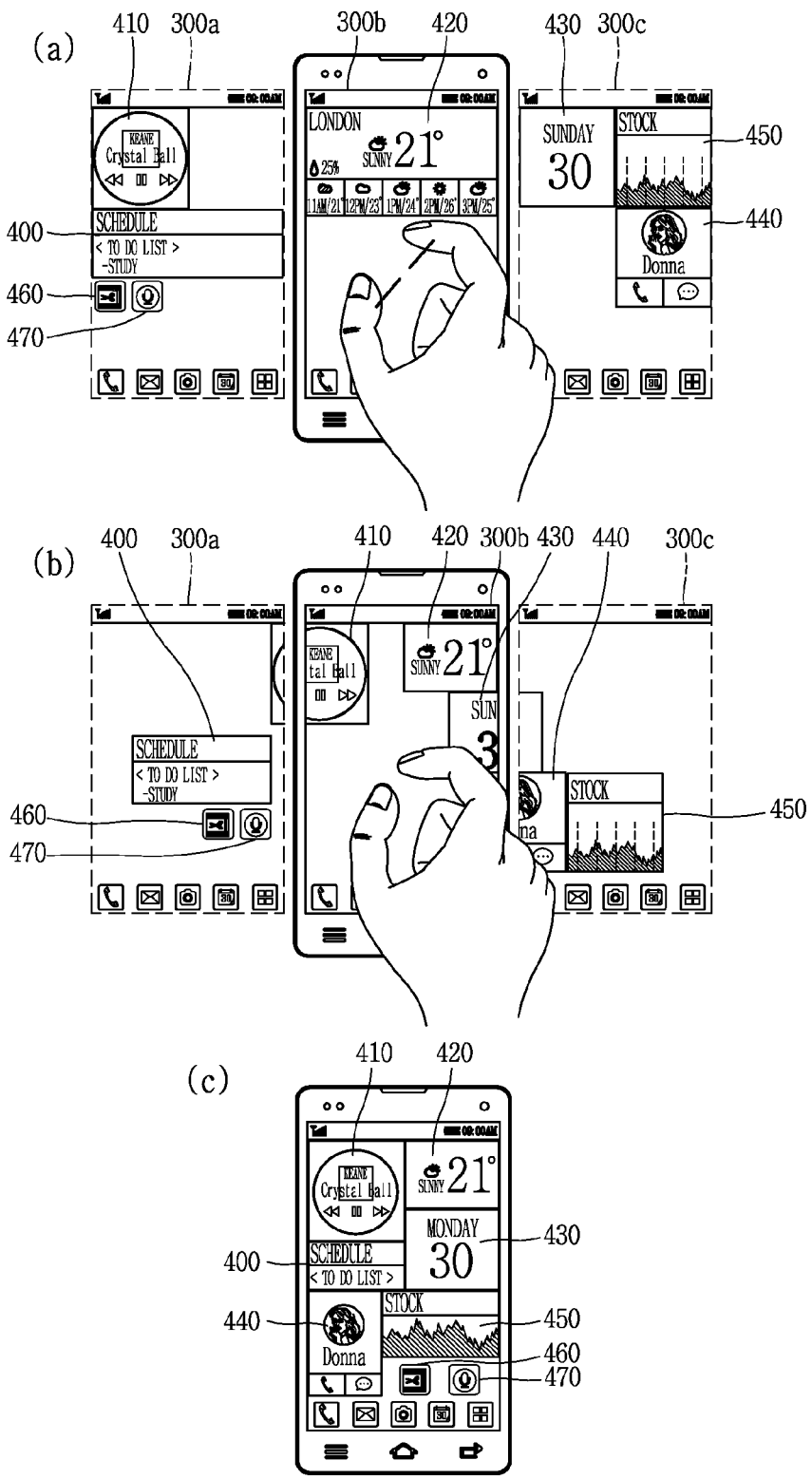
FIGS. 4A and 4B are conceptual views for explaining a control method of FIG. 2.
Figure 4B:
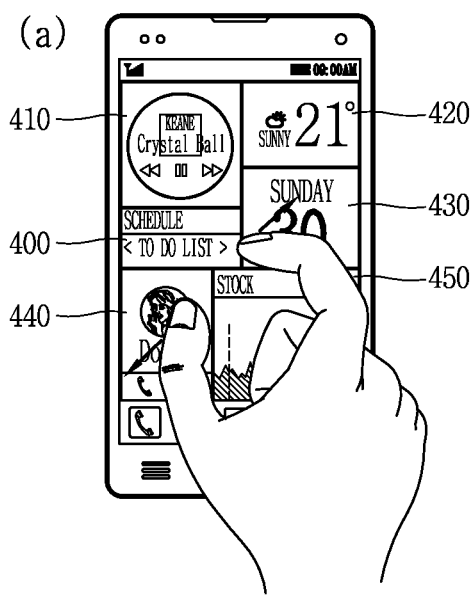
Figure 4B:
Figure 4B:
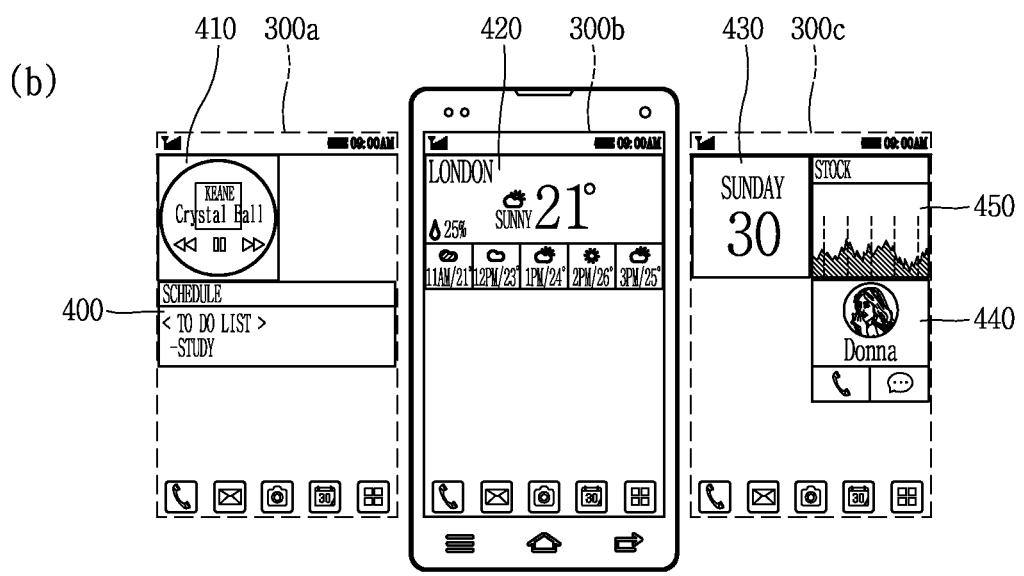
Figure 5:
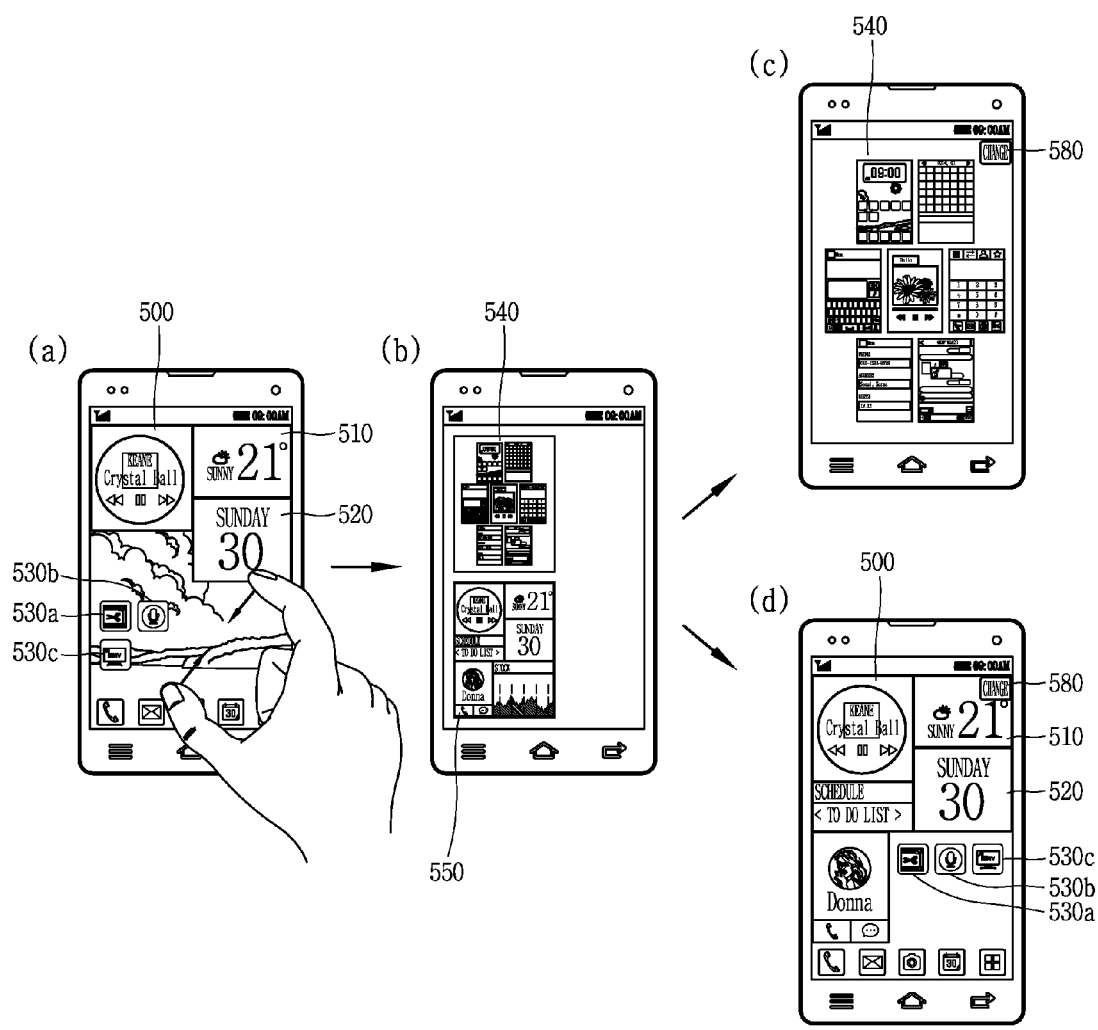
FIG. 5 is a conceptual view for explaining a method of receiving a user's selection from at least two functions, in response to input of a preset type of touch.

FIG. 2 is a flowchart illustrating a method of outputting graphic objects arranged on a plurality of home screen pages, to a single page in a mobile terminal according to an embodiment of the present invention. FIG. 3 is a conceptual view illustrating home screen pages according to the present invention. FIGS. 4A and 4B are conceptual views for explaining a control method of FIG. 2. FIG. 5 is a conceptual view for explaining a method of receiving a user's selection from at least two functions, in response to input of a preset type of touch.

The mobile terminal according to an embodiment of the present invention may output, on the display unit 151, a single home screen page among a plurality of home screen pages (S210).

The home screen page may be represented as an idle screen of the mobile terminal. In a case where the mobile terminal is in an idle state, the home screen page can be output to the display unit 151. The idle state of the mobile terminal may be a state where at least one of a plurality of applications installed at the mobile terminal is executable.

As shown in FIG. 3, the home screen page may be configured as a plurality of home screen pages 300a, 300b, 300c according to a user's selection or an initial setting of the mobile terminal. The number of the home screen pages may be set by a user, and addition and deletion of the home screen page may be also performed by a user. Under such configuration, a user uses the plurality of home screen pages, thereby extending a display region on the display unit of a limited size.

A different type of icon and widget may be displayed on each of the plurality of home screen pages. For instance, as shown in FIG. 3, a widget indicating a music play application may be arranged on one home screen page 300a, and a widget indicating a weather application may be arranged on another home screen page 300b.

One of the plurality of home screen pages 300a, 300b, 300c (e.g., 300b) may be output to the display unit 151 according to a user's selection.

The home screen page displayed on the display unit 151 may be changed as a preset type of touch is applied thereto. The preset type of touch may be a drag touch, a flick touch, a pinch-in touch, a pinch-out touch, etc. For instance, the controller 180 may output another home screen page (e.g., 300c) different from said one home screen page 300a, in response to a flick touch applied to the display unit 151.

As shown in FIG. 3, one or more application-related graphic objects may be displayed on the home screen page. The graphic object may be an application-related widget, icon, etc. The widget may provide a user with a function of an application on a home screen page, by executing the application on the home screen page. The icon may provide a function to execute an application corresponding to the icon, by a user's touch.

The graphic object may be arranged on or deleted from a home screen page, by a user's selection. In order to arrange an icon and a widget on a home screen page, the controller 180 may output a list of widgets and icons related to a plurality of applications installed at the mobile terminal, based on a preset type of touch to the display unit 151. For instance, the controller 180 may output a list of widgets and icons related to a plurality of applications installed at the mobile terminal, if a long touch is applied to the display unit 151. Under such configuration, a user may select one of the widgets and the icons included in the list, thereby arranging it on a home screen page.

The controller 180 may touch a preset type of touch to one of an icon and a widget arranged on a home screen page, thereby not outputting the icon or the widget to the home screen page any longer. For instance, once a long touch is applied to a region where one of an icon and a widget has been displayed, the controller 180 may display screen information for deleting the icon and the widget.

The home screen page may include at least one of a state information region 200 indicating state information of the mobile terminal, a screen information region 210 indicating screen information such as an icon and a widget, and a preset region 230 where icons for performing basic functions of the mobile terminal have been arranged.

At least one of antenna information, communication mode information, battery information, occurred-event information, preset function information, and time information of the mobile terminal may be output to the state information region 200.

A widget icon and identification information 310, which indicates the order of a currently-displayed home screen page 300b among a plurality of home screen pages 300a, 300b, 300c, may be output to the screen information region 210.

Icons corresponding to a specific application preset by a user's selection or the controller may be displayed on the preset region 230 in a fixed manner.

In a case where at least one of the home screen pages 300a, 300b, 300c has been output to the display unit 151, the controller 180 may continuously output at least one of the identification information 310, the state information region 200 and the preset region 230, on a predefined position on the display unit 151.

In a state where one home screen page has been displayed on the display unit 151, the mobile terminal according to an embodiment of the present invention may display graphic objects arranged on a plurality of home screen pages, on a single page, in response to a preset type of touch applied to the display unit (S220).

In a state where one of the plurality of home screen pages 300a, 300b, 300c (e.g., 300b) has been output, the controller 180 may display graphic objects arranged on the plurality of home screen pages, on a single page, in response to a preset type of touch to the display unit 151.

The single page may be one of the plurality of home screen pages 300a, 300b, 300c (e.g., 300b), or may be a new page different from the plurality of home screen pages 300a, 300b, 300c. The new page may be a new home screen page different from the plurality of home screen pages, or may be a graphic object-displayable page rather than a home screen page.

Hereinafter, will be explained a case where graphic objects arranged on the plurality of home screen pages are arranged on one of the plurality of home screen pages 300a, 300b, 300c (e.g., 300b). However, the present invention may be also applicable to a case where graphic objects arranged on the plurality of home screen pages 300a, 300b, 300c are arranged on a single new page.

Referring to FIG. 4A, the controller 180 may sense a preset type of touch to the display unit 151, in a state where one home screen page has been displayed on the display unit 151. The preset type of touch may be at least one of a long-touch, a double-touch, a pinch-in touch, a pinch-out touch, a flick touch and a combination thereof.

As shown in FIG. 4A(a), the preset type of touch may be a pinch-in touch.

Upon detection of a preset type of touch to the display unit 151, the controller 180 may display graphic objects 400, 410, 420, 430, 440, 450, 460, 470 arranged on the plurality of home screen pages 300a, 300b, 300c. In this case, the graphic objects 400, 410, 420, 430, 440, 450, 460, 470 arranged on the plurality of home screen pages 300a, 300b, 300c may be displayed on a single page. The single page may be the aforementioned home screen page, or may be a graphic object-displayable page different from the home screen page.

As shown in FIG. 4A(b), while the pinch-in touch is applied to the display unit 151, i.e., while the pinch-in touch is maintained, the controller 180 may display screen information indicating that graphic objects arranged on a plurality of home screen pages are shifting to a single page.

More specifically, at least part of the graphic objects 400, 410, 430, 440, 450, 460, 470 arranged on other home screen pages rather than the currently-displayed home screen page may be displayed on the display unit 151. The graphic object 420 arranged on the currently-displayed home screen page may have a changed size. Information, indicating that at least part of the graphic objects 400, 410, 430, 440, 450, 460, 470 arranged on other home screen pages rather than the currently-displayed home screen page is shifting, may be output.

Graphic objects to be displayed on a single page may be at least part among the graphic object 420 currently-output to the display unit 151, and the graphic objects 400, 410, 430, 440, 450, 460, 470 arranged on other home screen pages 300a, 300c rather than the currently-displayed home screen page 300b.

The graphic objects to be displayed on a single page may be graphic objects which satisfy a preset condition, or all the graphic objects arranged on the plurality of home screen pages.

The preset condition may be a user's usage pattern, a touch point where a preset type of touch has been applied, etc. For instance, the graphic objects to be displayed on a single page may be the same type of graphic objects as a graphic object (widget or icon) displayed on a touch point to which a user's touch has been applied. Alternatively, the graphic objects to be displayed on a single page may be graphic objects related to an application having a high frequency of usage at the current time zone.

Still alternatively, the graphic objects to be displayed on a single page may be graphic objects arranged on other home screen pages rather than one home screen page which was being output when the preset type of touch has been applied. That is, in a case where a preset type of touch is applied to the display unit 151, the controller 180 determines that a user wishes to view graphic objects arranged on home screen pages rather than the currently-displayed home screen page. As a result, the controller 180 may arrange graphic objects arranged on home screen pages rather than the currently-displayed home screen page, on a single page.

Upon completion of input of the preset type of touch, the controller 180 may output the graphic objects 400, 410, 420, 430, 440, 450, 460, 470 arranged on the plurality of home screen pages, to the display unit 151 in different sizes.

The size of the graphic object displayed on the display unit may be determined by a function of an application corresponding to the graphic object, a user's usage pattern with respect to the graphic object, etc.

For instance, the controller 180 may detect a user's usage pattern with respect to an application, and may determine the size of a graphic object related to the application, based on the detected user's usage pattern.

More specifically, the controller 180 may display a graphic object related to an application having a relatively high frequency of usage, in a relatively larger size. On the other hand, the controller 180 may display a graphic object related to an application having a relatively low frequency of usage, in a relatively smaller size.

As another example, if a graphic object has function to provide information, the controller 180 may display the graphic object in a relatively smaller size. On the other hand, if the graphic object requires edition, the controller 180 may display the graphic object in a relatively larger size.

That is, the controller 180 may control the display unit 151 so that all of the graphic objects 400, 410, 420, 430, 440, 450, 460, 470 can be displayed on a single page, by controlling the size of the graphic objects 400, 410, 420, 430, 440, 450, 460, 470.

The size of the single page may be larger than that of an output region of the display unit 151. In this case, the controller 180 may not display at least part of a graphic object currently-displayed on the display unit 151, but may display graphic objects not currently-displayed on the display unit 151, by scrolling the single page.

The controller 180 may determine a display position of the graphic objects 400, 410, 420, 430, 440, 450, 460, 470 on the single page, according to a preset condition. The preset condition may be the order of home screen pages where the graphic objects have been originally positioned, a type of the graphic objects, a user's frequency of usage, etc.

For instance, the controller 180 may determine a display position of the graphic objects, based on the order of the home screen pages.

The order of the home screen pages may be set by a user's selection. For instance, as shown in FIG. 3, the order of the home screen pages may be set as '1, 2, 3' from the left side, based on a front surface of the mobile terminal.

More specifically, the controller 180 may arrange the graphic objects, based on the order of the home screen pages on which the graphic objects have been originally arranged. For instance, in a case where the order of the home screen pages is '1, 2, 3' from the left side, the controller 180 may display a graphic object arranged on the first home screen page, on an upper end of the display unit 151. And the controller 180 may display a graphic object arranged on the second home screen page, on a middle end of the display unit 151, and may display a graphic object arranged on the third home screen page, on a lower end of the display unit 151.

If the graphic objects arranged on the plurality of home screen pages are the same type of graphic objects, the controller 180 may display the graphic objects on one region of the single page in an overlapping manner. Such displaying in an overlapping manner may mean that at least two graphic objects can be displayed on a specific region together, and said at least two graphic objects are controlled such that content of one of them is displayed while content of another is not displayed. That is, a user can view content of one of at least two graphic objects. Under such configuration, a user can view a plurality of same type of graphic objects, in a simple manner.

In a state where a plurality of graphic objects have been displayed on a single page, the controller 180 may edit each of the displayed graphic objects. The edition of the graphic object may mean deletion of the graphic object from the display unit 151, addition of a new graphic object, change of the shape of the graphic object, or change of setting related to the graphic object. That is, the single page may be a page which provides a user with screen information for editing a graphic object.

If a touch different from the preset type of touch is applied to the display unit 151 in a state where the single page has been displayed on the display unit 151, the controller 180 may not output the graphic objects 400, 410, 420, 430, 440, 450, 460, 470 having been displayed on the single page any longer. Rather, the controller 180 may output, to the display unit 151, one home screen page 300b which has been displayed on the display unit 151 before the graphic objects arranged on the plurality of home screen pages are displayed on the single page.

The touch different from the preset type of touch may be a touch different from a touch for outputting the plurality of graphic objects to a single page, which may be a long-touch, a flick touch, a pinch-in touch, or a pinch-out touch.

For instance, if a pinch-in touch is defined as an operation to output the plurality of graphic objects to a single page, a pinch-out touch may be defined as an operation not to output the plurality of graphic objects any longer.

For instance, as shown in FIG. 4B(a), in a state where the graphic objects 400, 410, 420, 430, 440, 450, 460, 470 arranged on the plurality of home screen pages have been displayed on the display unit 151, if a pinch-out touch is applied to the display unit 151, the controller 180 may not display the graphic objects 400, 410, 420, 430, 440, 450, 460, 470 any longer.

The controller 180 may output one home screen page 300b which has been displayed on the display unit 151, before the graphic objects 400, 410, 420, 430, 440, 450, 460, 470 arranged on the plurality of home screen pages are output to the display unit 151.

The controller 180 may arrange the graphic objects 400, 410, 420, 430, 440, 450, 460, 470, on the original home screen pages, respectively. If the graphic objects 400, 410, 420, 430, 440, 450, 460, 470 have been edited on a single page, the controller 180 may arrange the graphic objects on the original home screen pages, in the edited state.

For instance, the controller 180 may change a shape of the graphic objects 400, 410, 420, 430, 440, 450, 460, 470, on a single page, based on a user's control command. In this case, in response to a different type of touch, the controller 180 may re-arrange the graphic objects 400, 410, 420, 430, 440, 450, 460, 470, on the original home screen pages, with the changed shape.

That is, a user can edit the graphic objects 400, 410, 420, 430, 440, 450, 460, 470 arranged on the plurality of home screen pages, on a single page. Then the user may arrange the edited graphic objects 400, 410, 420, 430, 440, 450, 460, 470 on the original home screen pages, respectively.

The controller 180 may execute one of at least two functions, in response to input of a preset type of touch. That is, in the present invention, there may exist at least two functions which are executable according to the preset type of touch. One of said at least two functions is a function to output thumbnail images 540 corresponding to a plurality of home screen pages. Another function different from the one function may be a function to output graphic objects 500, 510, 520, 530a, 530b, 530c, 560, 570 arranged on a plurality of home screen pages to a single page.

In this case, the controller 180 may output screen information for receiving a user's selection from at least two functions, in response to input of a preset type of touch.

For instance, as shown in FIGS. 5(a) and 5(b), the controller 180 may output at least two graphic objects 540, 550 indicating said at least two functions, in response to input of a pinch-in touch.

As shown in FIGS. 5(c) and 5(d), upon selection of one of said at least two graphic objects 540, 550 (e.g., 550), the controller 180 may execute a function of the selected graphic object 550.

As shown in FIGS. 5(c) and 5(d), after execution of the function of the one selected graphic object, the controller 180 may output, to one region of the display unit 151, a conversion graphic object 580 for converting the current function to the function of another graphic object 540.

Upon selection of the conversion graphic object 580, the controller 180 may execute the function of another graphic object 540, rather than the function of one graphic object 550.

So far, it has been explained that graphic objects dispersed on a plurality of home screen pages are displayed on a single page, through simple manipulations. The present invention provides a method capable of allowing a user to view graphic objects dispersed on a plurality of home screen pages at a glance.

Hereinafter, will be explained a method of determining the size of graphic objects in case of displaying the graphic objects arranged on a plurality of home screen pages to a single page.

FIGS. 6A to 6D are conceptual views for explaining a method of determining the size of graphic objects, in case of displaying the graphic objects arranged on a plurality of home screen pages to a single page.

Upon detection of a preset type of touch to the display unit 151, the controller 180 may output graphic objects 600, 610, 620, 630, 640 arranged on a plurality of home screen pages 300a, 300b, 300c, to a single page.

The graphic objects 600, 610, 620, 630, 640 output to a single page may have different sizes. The controller 180 may determine the size of the graphic objects 600, 610, 620, 630, 640, based on a preset condition or a user's selection.

The preset condition may be at least one of a user's usage pattern with respect to a graphic object, and a function of the graphic object.

Figure 6A:
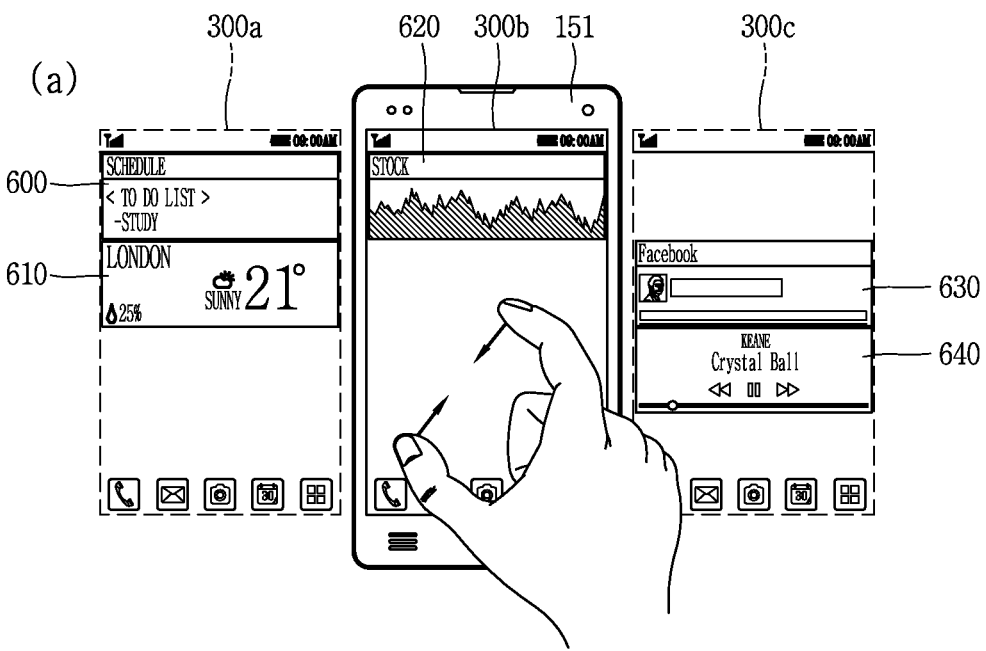
FIGS. 6A to 6D are conceptual views for explaining a method of determining the size of graphic objects, in case of displaying the graphic objects arranged on a plurality of home screen pages, to a single page.
Figure 6A:
Figure 6A:
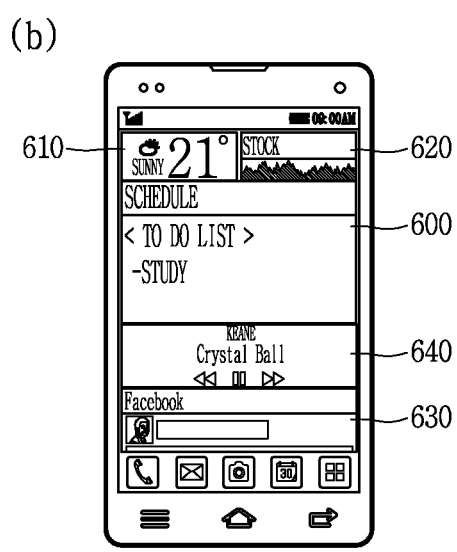

For instance, as shown in FIG. 6A(a), a user may apply a pinch-in touch to the display unit 151. The controller 180 may detect functions of the graphic objects 600, 610, 620, 630, 640 arranged on the plurality of home screen pages 300a, 300b, 300c.

The controller 180 may output the graphic objects 600, 610, 620, 630, 640 in different sizes, according to the detected functions of the graphic objects.

For instance, as shown in FIG. 6A(b), the graphic object 600 selected from the graphic objects 600, 610, 620, 630, 640, which is a graphic object indicating a schedule, may be output in a larger size than other graphic objects 610, 620, 630, 640. The reason is because an application corresponding to the graphic object 600 has an edition function. On the other hand, said other graphic objects 610, 620, 630, 640 may be output in a smaller size than the graphic object 600.

Figure 6B:
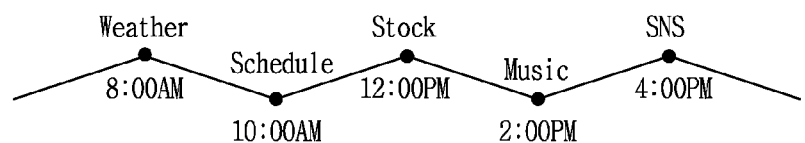
Figure 6B:
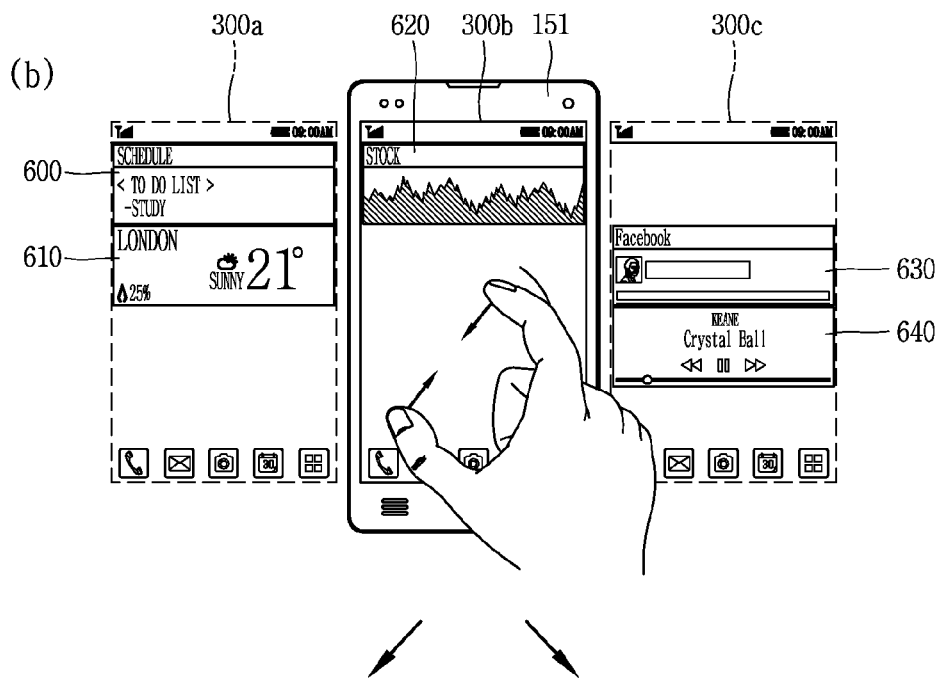
Figure 6B:
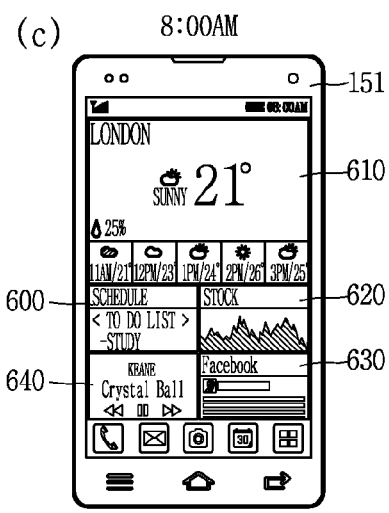
Figure 6B:
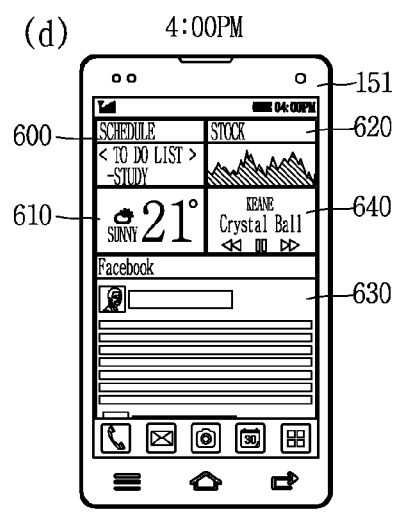

As another example, as shown in FIG. 6B(a), the controller 180 may detect a user's usage pattern with respect to a graphic object, by time. For instance, the controller 180 may detect an application having a highest frequency of usage, in unit of a preset time. More specifically, the controller 180 may detect information indicating that a weather application is the most frequently used from 8:00 AM to 10:00 AM, and a music application is the most frequently used from 2:00 PM to 4:00 PM.

As shown in FIG. 6B(b), the controller 180 may detect a preset type of touch to the display unit 151. The controller 180 may display the graphic objects 600, 610, 620, 630, 640 on a single page in different sizes, based on a time when the preset type of touch is applied to the display unit 151.

For instance, as shown in FIG. 6B(c), if the preset type of touch is input between 8:00 AM and 10:00 AM, the controller 180 may output the graphic object 610 indicating a weather application which is the most frequently used at that time zone, in a relatively larger size. And the controller 180 may output other graphic objects 600, 620, 630, 640 rather than the graphic object 610 indicating a weather application, in a relatively smaller size.

As another example, as shown in FIG. 6B(d), if the preset type of touch is input between 4:00 PM and 6:00 PM, the controller 180 may output the graphic object 630 indicating an SNS application which is the most frequently used at that time zone, in a relatively larger size. And the controller 180 may output other graphic objects 600, 610, 620, 640 rather than the graphic object 630 indicating an SNS application, in a relatively smaller size.

So far, it has been explained that the size of a graphic object is determined by the controller 180. However, the size of the graphic object may be determined by a user's selection.

A user may select the size of the graphic object by applying a touch to the display unit 151. Alternatively, the user may change the size of the graphic object into a desired size by applying a preset type of touch to the display unit 151. In this case, each preset type of touch is predefined to match a corresponding size.

As the preset type of touch, various types of touches may be set. Each of the plurality of touches may be provided with a control command for changing the size of a corresponding graphic object. That is, the controller 180 may change the size of the graphic object into a different size according to a touch type.

Figure 6C:
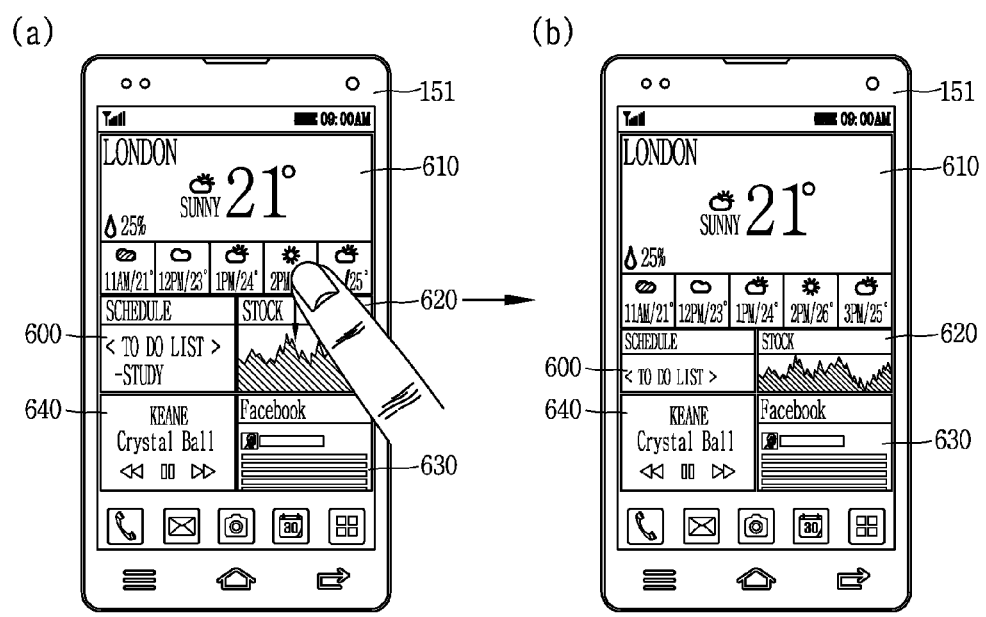

For instance, as shown in FIG. 6C(a), a user may apply a touch to the display unit 151, in a state where a plurality of graphic objects 600, 610, 620, 630, 640 have been displayed on a single page, thereby changing the size of at least part of the graphic objects 600, 610, 620, 630, 640.

More specifically, a user may apply a drag input to an edge region of one of the graphic objects 600, 610, 620, 630, 640 (e.g., 610). In this case, the controller 180 may output the graphic object 610 in size increased in correspondence to an area of the drag input. And the controller 180 may output the graphic objects 600, 620 adjacent to the graphic object 610 in a relatively smaller size. More specifically, the graphic objects 600, 620 adjacent to the graphic object 610 may have size decrease corresponding to the size increase of the graphic object 610.

Figure 6D:
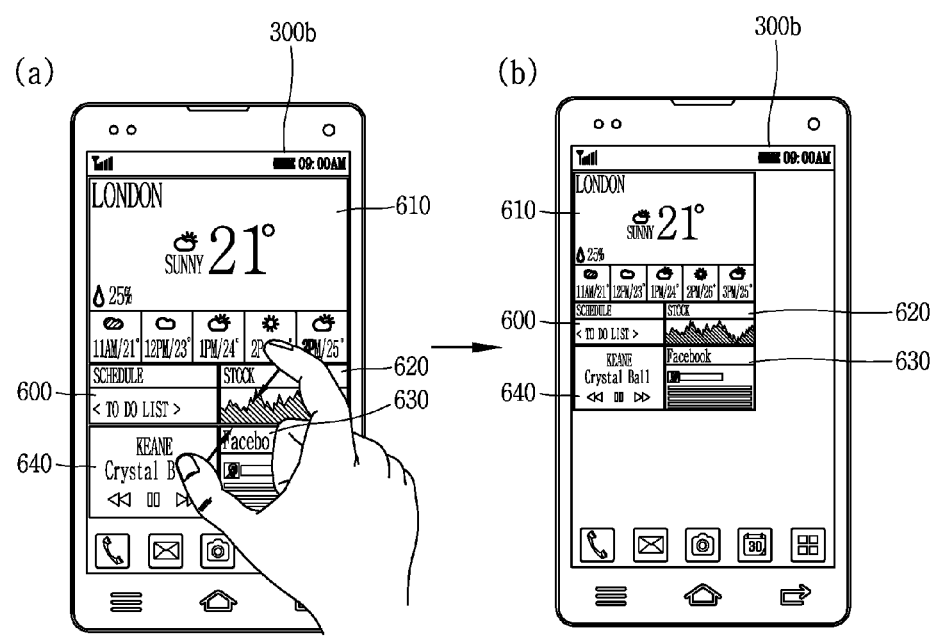

As another example, as shown in FIG. 6D(a), a user may apply a preset type of touch to the display unit 151, in a state where the graphic objects 600, 610, 620, 630, 640 have been displayed on a single page, thereby changing the size of at least part of the graphic objects 600, 610, 620, 630, 640. The preset type of touch may be a pin-in touch.

As shown in FIG. 6D(b), the controller 180 may output all of the graphic objects 600, 610, 620, 630, 640 in a small size, in response to the preset type of touch.

Although not shown, the controller 180 may output all of the graphic objects 600, 610, 620, 630, 640 in a large size, in response to a pinch-out touch.

That is, the controller 180 may determine the size of the graphic objects 600, 610, 620, 630, 640 according to a type of a touch applied to the display unit 151.

So far, has been explained a method of changing the size of graphic objects displayed on a single page. In the present invention, graphic objects may be displayed on a single page in a suitable manner for characteristics of a user of the mobile terminal.

The present invention may provide a method of conveniently enlarging or contracting graphic objects according to circumstances, by arbitrarily changing the size of the graphic objects displayed on a single page.

Figure 7B:
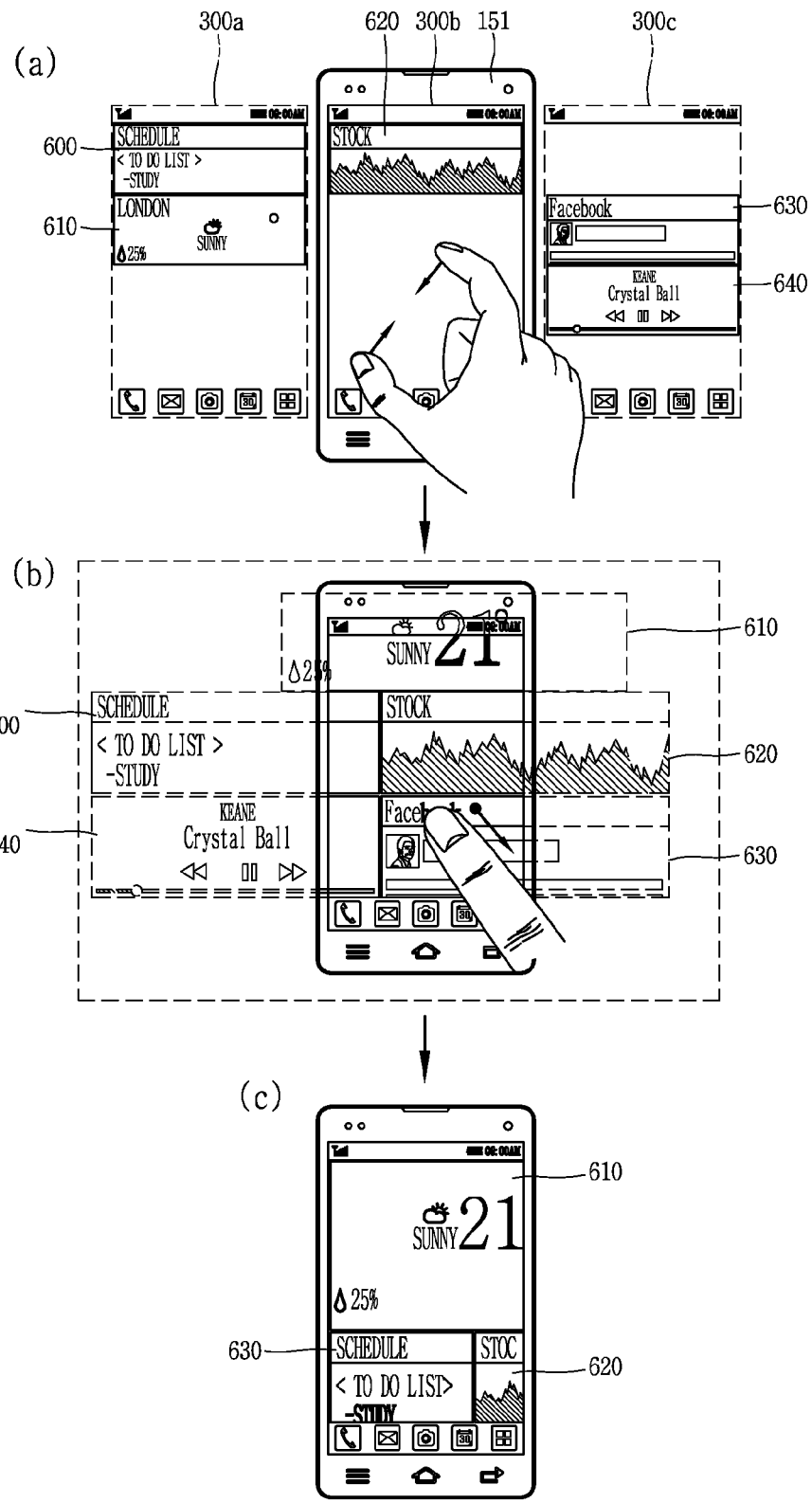

Hereinafter, will be explained a method of displaying graphic objects on a single page in a case where the number of graphic objects 600, 610, 620, 630, 640 arranged on a plurality of home screen pages 300*a*, 300*b*, 300*c* is large. FIGS. 7A and 7B are conceptual views illustrating a method of displaying graphic objects on a single page, in a case where the number of graphic objects 600, 610, 620, 630, 640 arranged on the plurality of home screen pages 300*a*, 300*b*, 300*c* is large.

The controller 180 may output the graphic objects 600, 610, 620, 630, 640 arranged on the plurality of home screen pages 300*a*, 300*b*, 300*c*, to a single page, in response to input of a preset type of touch.

As shown in FIG. 7A(b), in a case where some of the graphic objects are to be displayed on a single page, the controller 180 may display the graphic objects 600, 610, 620 among the graphic objects 600, 610, 620, 630, 640 on the display unit 151.

The controller 180 may display the graphic objects 620, 630, 640 not currently displayed on the display unit 151, by scrolling the single page. For instance, as shown in FIG. 7A(b), a user may scroll the single page by a drag input.

As shown in FIG. 7A(c), in response to the scroll, the controller 180 may display the graphic objects 620, 630, 640 which have not been displayed prior to the scroll.

In FIG. 7A, the graphic objects 600, 610, 620, 630, 640 are displayed in a lengthwise direction based on a front surface of the mobile terminal. However, the graphic objects 600, 610, 620, 630, 640 may not be aligned in a lengthwise direction.

For instance, as shown in FIG. 7B(b), each of the graphic objects 600, 610, 620, 630, 640 may be partially displayed on the display unit 151.

More specifically, upon detection of a preset type of touch, the controller 180 may display the graphic objects 600, 610, 620, 630, 640 arranged on the plurality of home screen pages 300*a*, 300*b*, 300*c*, to a single page. The single page may be a page having a virtual region larger than an output region of the display unit 151.

The controller 180 may display one region of the single page. Each of the graphic objects 600, 610, 620, 630, 640 may be partially displayed on said one region of the single page.

A user may apply a drag input to the display unit 151 so as to view the other parts of the graphic objects 600, 610, 620, 630, 640 which have not been displayed on the display unit 151.

The controller 180 may shift the graphic objects 600, 610, 620, 630, 640 displayed on the display unit 151, in a direction corresponding to the drag input. The other parts of the graphic objects, which have not been output prior to the drag input, may be displayed on the display unit 151 by the shifting of the graphic objects 600, 610, 620, 630, 640.

For instance, as shown in FIG. 7B(c), the other parts of the graphic objects 600, 610, 620, 630, 640 may be displayed on the display unit 151.

So far, a method of outputting graphic objects which are not currently-displayed by scrolling, in a case where the number of graphic objects arranged on a plurality of home screen pages is large, has been explained. In the present invention, even in a case where the number of graphic objects arranged on a plurality of home screen pages is large, all of the plurality of graphic objects can be output to a single page by scrolling.

Figure 8A:
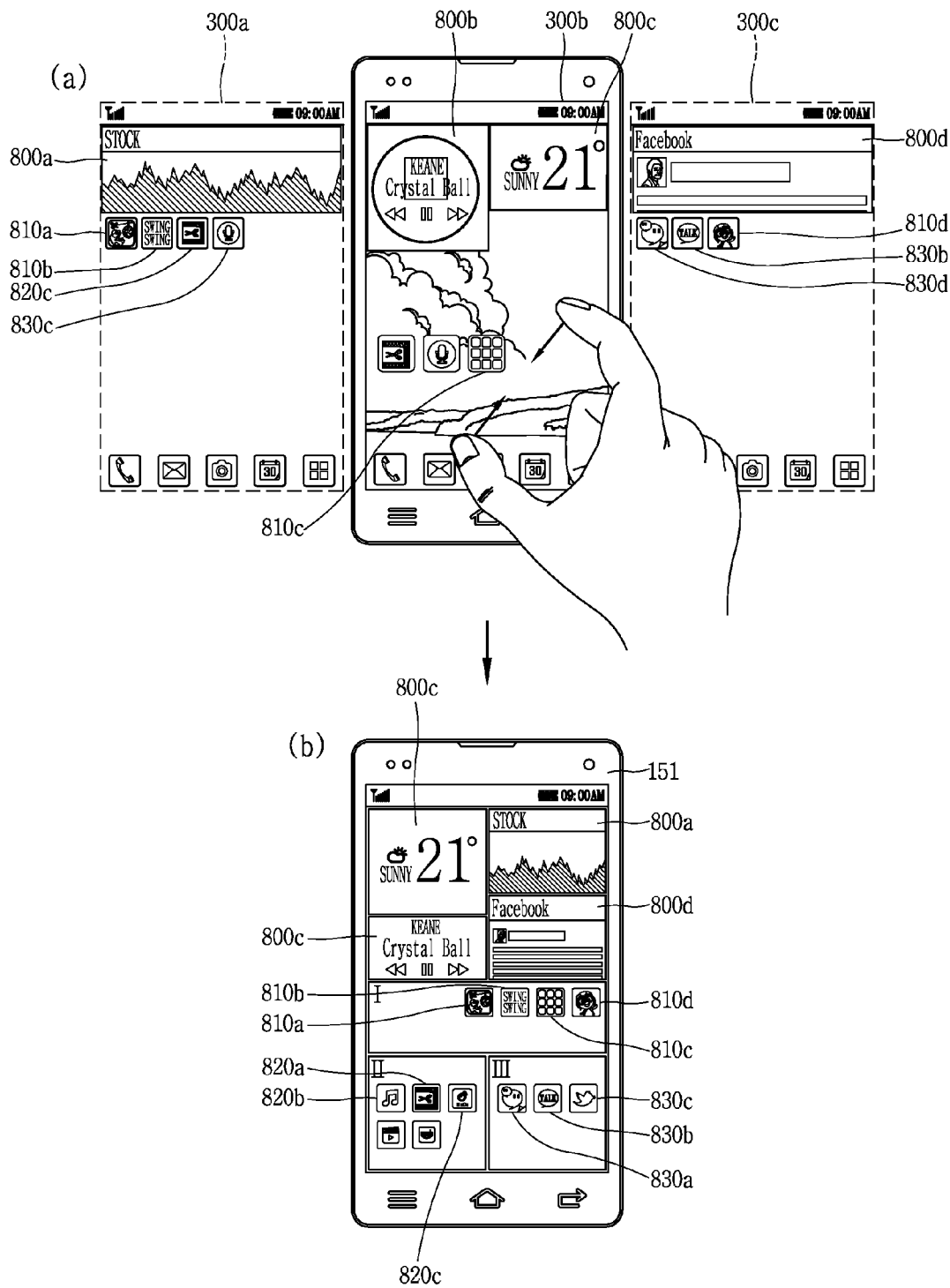
FIGS. 8A to 8C are conceptual views illustrating a method of aligning graphic objects, in a case where the graphic objects arranged on a plurality of home screen pages have been output to a single page, in response to input of a preset type of touch.
Figure 8B:
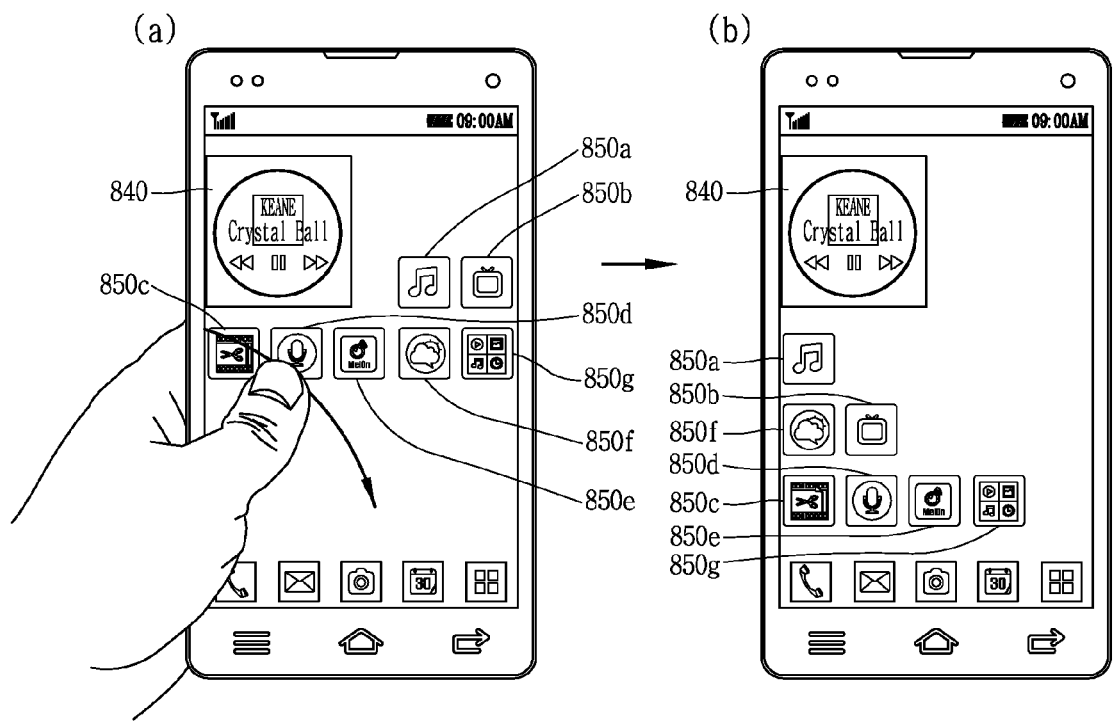
Figure 8C:
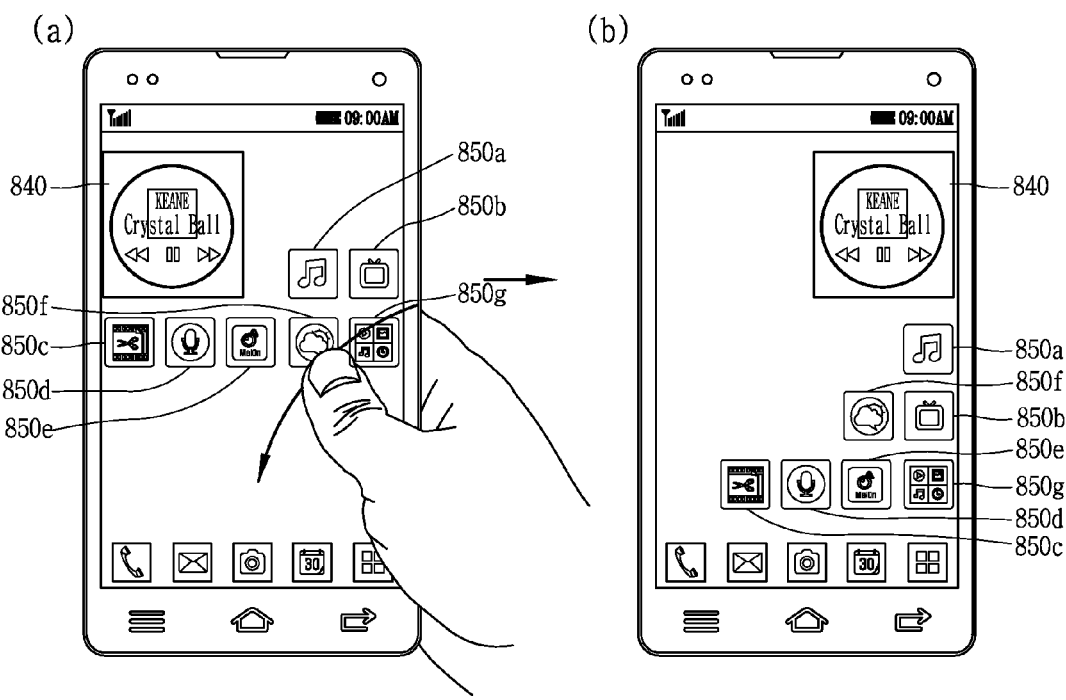

Hereinafter, will be explained a method of aligning graphic objects, in a case where the graphic objects arranged on a plurality of home screen pages have been output to a single page, in response to input of a preset type of touch. FIGS. 8A to 8C are conceptual views illustrating a method of aligning graphic objects, in a case where the graphic objects arranged on a plurality of home screen pages have been output to a single page, in response to input of a preset type of touch.

The controller 180 may output graphic objects 800*a*, 800*b*, 800*c*, 800*d*, 810*a*, 810*b*, 810*c*, 810*d*, 820*a*, 820*b*, 820*c*, 830*a*, 830*b*, 830*c* arranged on a plurality of home screen pages 300*a*, 300*b*, 300*c*, to a single page, in response to a preset type of touch to the display unit 151.

In this case, the controller 180 may display the graphic objects 800*a*, 800*b*, 800*c*, 800*d*, 810*a*, 810*b*, 810*c*, 810*d*, 820*a*, 820*b*, 820*c*, 830*a*, 830*b*, 830*c*, on a single page, according to a preset condition.

The preset condition may be at least one of a type of a graphic object, a type of a sensed touch input, and a function of a graphic object-related application.

For instance, as shown in FIG. 8A(a), the controller 180 may output graphic objects 800*a*, 800*b*, 800*c*, 800*d*, 810*a*, 810*b*, 810*c*, 810*d*, 820*a*, 820*b*, 820*c*, 830*a*, 830*b*, 830*c* arranged on a plurality of home screen pages 300*a*, 300*b*, 300*c*, to a single page, in response to a preset type of touch to the display unit 151.

The controller 180 may output the graphic objects 800*a*, 800*b*, 800*c*, 800*d*, 810*a*, 810*b*, 810*c*, 810*d*, 820*a*, 820*b*, 820*c*, 830*a*, 830*b*, 830*c* to the single page, in an aligning manner according to a preset condition.

For instance, as shown in FIG. 8A(b), the controller 180 may align the graphic objects 800*a*, 800*b*, 800*c*, 800*d*, 810*a*, 810*b*, 810*c*, 810*d*, 820*a*, 820*b*, 820*c*, 830*a*, 830*b*, 830*c*, according to functions of graphic object-related applications.

More specifically, the controller 180 may sort the graphic objects. For instance, the controller 180 may categorize the graphic objects into widgets 800*a*, 800*b*, 800*c*, 800*d* and icons 810*a*, 810*b*, 810*c*, 810*d*, 820*a*, 820*b*, 820*c*, 830*a*, 830*b*, 830*c*.

Then the controller 180 may categorize the icons according to functions of applications related to the graphic objects classified as the icons. For instance, the controller 180 may categorize the icons into game applications 810*a*, 810*b*, 810*c*, 810*d*, music applications 820*a*, 820*b*, 820*c*, and SNS applications 830*a*, 830*b*, 830*c*.

As shown in FIG. 8B(b), after the categorization of the icons, the controller 180 may output the widgets 800*a*, 800*b*, 800*c*, 800*d* and the icons 810*a*, 810*b*, 810*c*, 810*d*, 820*a*, 820*b*, 820*c*, 830*a*, 830*b*, 830*c*, to different regions on the display unit 151. The controller 180 may display the icons on different regions, based on classification information according to the functions. In this case, as shown in FIG. 8B(b), the controller 180 may display the icons in the same group.

The controller 180 may output graphic objects to the display unit 151, in a sorting manner by type. Alternatively, the controller 180 may output graphic objects to the display unit 151, in a sorting manner by function. Still alternatively, as aforementioned, the controller 180 may output graphic objects to the display unit 151, in a sorting manner by type and function. This may be selected by a user.

In a state where the graphic objects 800*a*, 800*b*, 800*c*, 800*d*, 810*a*, 810*b*, 810*c*, 810*d*, 820*a*, 820*b*, 820*c*, 830*a*, 830*b*, 830*c* arranged on the plurality of home screen pages 300*a*, 300*b*, 300*c* have been output to a single page, the controller 180 may align the graphic objects 800*a*, 800*b*, 800*c*, 800*d*, 810*a*, 810*b*, 810*c*, 810*d*, 820*a*, 820*b*, 820*c*, 830*a*, 830*b*, 830*c* according to input of a preset type of touch.

The preset type of touch may be a touch input applied using a single hand. Whether a touch input has been applied using a single hand or not may be sensed by a bezel sensor.

That is, the controller 180 may sense, using a bezel sensor, that the mobile terminal is being held by a user's single hand. The bezel sensor may be provided at right and left sides of the mobile terminal. The controller 180 may sense that the mobile terminal is being held by a user's right hand or left hand, according to whether a touch input is sensed by the right bezel sensor or the left bezel sensor.

For instance, as shown in FIG. 8B(a), the controller 180 may sense a touch using a bezel sensor, in a state where graphic objects 840, 850*a*, 850*b*, 850*c*, 850*d*, 850*e*, 850*f*, 850*g* arranged on a plurality of home screen pages have been output to a single page.

In this case, the controller 180 may arrange the graphic objects 840, 850*a*, 850*b*, 850*c*, 850*d*, 850*e*, 850*f*, 850*g* by a preset aligning method, based on the sensed touch input.

For instance, as shown in FIG. 8B(b), upon sensing of a touch by a left bezel sensor, the controller 180 may arrange the graphic objects 840, 850*a*, 850*b*, 850*c*, 850*d*, 850*e*, 850*f*, 850*g* on the left side of the display unit 151. In this case, the controller 180 may arrange the graphic objects 840, 850*a*, 850*b*, 850*c*, 850*d*, 850*e*, 850*f*, 850*g* on the left side, in a pyramid form.

Likewise, as shown in FIGS. 8C(a) and (b), upon sensing of a touch by a right bezel sensor, the controller 180 may arrange the graphic objects 840, 850*a*, 850*b*, 850*c*, 850*d*, 850*e*, 850*f*, 850*g* on the right side of the display unit 151.

The method of changing icons and widgets displayed on the display unit 151 using the bezel sensor may be performed on a single page. However, the method may be performed on a home screen page. For instance, in case of changing an aligned state of graphic objects on a home screen page, a user may apply a touch input to the display unit 151 in a state where the home screen page has been displayed. Accordingly, the user may change an aligned state of graphic objects in the same manner as the aforementioned manner.

In case of changing an aligned state of graphic objects on a single page, the aligned state may be maintained even when the graphic objects are arranged on the original home screen pages. For instance, in a case where graphic objects have been arranged on the left side of the display unit 151, the graphic objects may be also arranged on the left side of each of a plurality of home screen pages. That is, the controller 180 may maintain the aligned state of the graphic objects not only on the single page, but also on the plurality of home screen pages.

So far, has been explained a method of changing an aligned state of graphic objects output to a single page. The present invention may provide a method of viewing graphic objects in a more intuitive manner. The present invention may also provide a method of conveniently viewing graphic objects through a user's simple manipulation.

Figure 9A:
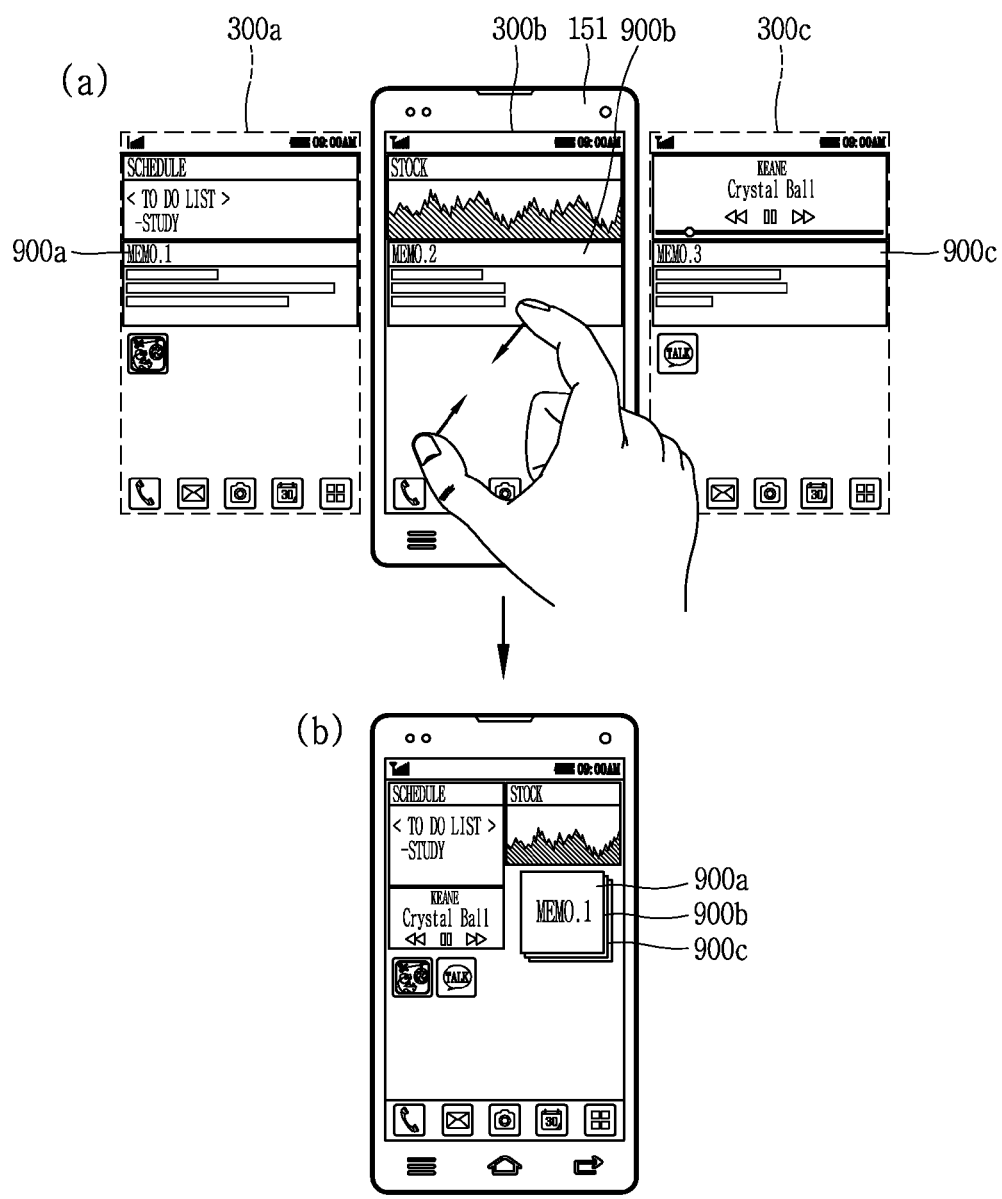
FIGS. 9A and 9B are conceptual views illustrating a method of outputting graphic objects related to the same application to a single page, in a case where the graphic objects related to the same application have been arranged on a plurality of home screen pages.
Figure 9B:
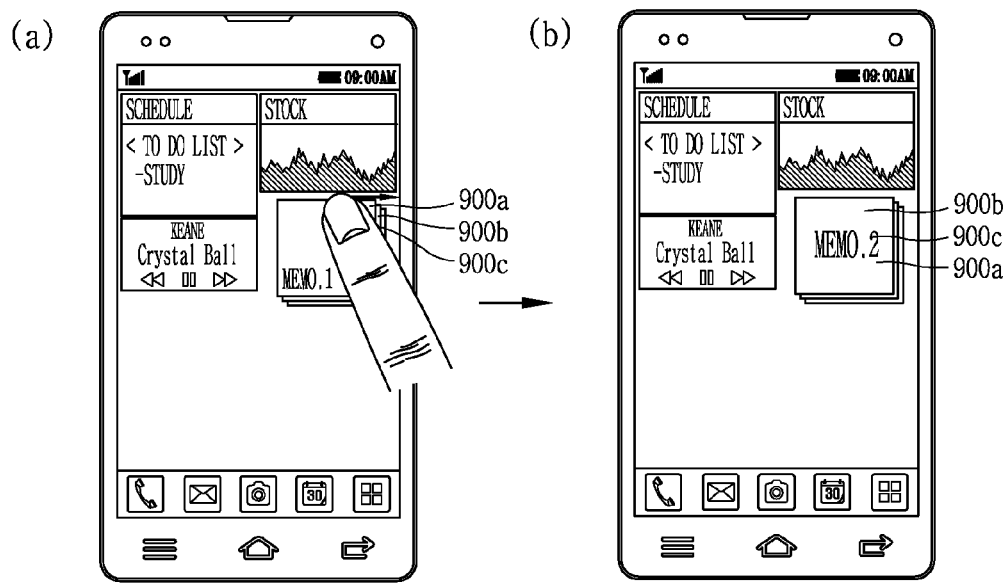

Hereinafter, will be explained a method of outputting graphic objects related to the same application to a single page, in a case where the graphic objects related to the same application have been arranged on a plurality of home screen pages. FIGS. 9A and 9B are conceptual views illustrating a method of outputting graphic objects related to the same application to a single page, in a case where the graphic objects related to the same application have been arranged on a plurality of home screen pages.

The controller 180 may output graphic objects arranged on a plurality of home screen pages, to a single page, in response to a preset type of touch to the display unit 151. Graphic objects related to the same application may be arranged on some of the plurality of home screen pages.

In case of arranging at least two graphic objects related to the same application to a single page, the controller 180 may output said at least two graphic objects in an overlapping manner.

In case of outputting said at least two graphic objects in an overlapping manner, the controller 180 may output said at least two graphic objects in an overlapped form, so as to indicate an overlapped state of said at least two graphic objects. In this case, a user can view content of one of said at least two graphic objects.

For instance, as shown in FIG. 9A(a), at least two graphic objects 900*a*, 900*b*, 900*c* related to the same application (e.g., memo application) may be output to a plurality of home screen pages 300*a*, 300*b*, 300*c*, respectively.

Based on input of a preset type of touch, the controller 180 may display said at least two graphic objects 900*a*, 900*b*, 900*c* on a single page, in an overlapping manner.

For instance, as shown in FIG. 9A(b), the controller 180 may output said at least two graphic objects 900*a*, 900*b*, 900*c* on a single page, in an overlapping manner. In case of outputting said at least two graphic objects 900*a*, 900*b*, 900*c* in an overlapping manner, the controller 180 may output said at least two graphic objects 900*a*, 900*b*, 900*c* in an overlapped form. Under such configuration, a user can check that said at least two graphic objects 900*a*, 900*b*, 900*c* have been output in an overlapped manner.

In case of outputting said at least two graphic objects 900*a*, 900*b*, 900*c* related to the same application in an overlapping manner, the controller 180 may display, on the display unit 151, only content of one graphic object 900*a* among said at least two graphic objects 900*a*, 900*b*, 900*c*.

In this case, the controller 180 may display, on the display unit 151, content of another graphic object 900*b* different from said one graphic object 900*a*, in response to a user's touch input to said at least two graphic objects 900*a*, 900*b*, 900*c*.

For instance, as shown in FIG. 9B(b), the controller 180 may change memo content output to the display unit 151, in response to a user's touch input to said at least two graphic objects 900*a*, 900*b*, 900*c*. The touch may be a flicking touch to said at least two graphic objects 900*a*, 900*b*, 900*c* overlapped with each other. Under such configuration, the user can check content of all of said at least two graphic objects 900*a*, 900*b*, 900*c* overlapped with each other.

As aforementioned, said at least two graphic objects 900*a*, 900*b*, 900*c* related to the same application may be output in an overlapped manner. However, said at least two graphic objects 900*a*, 900*b*, 900*c* related to the same application may be output in a separate manner.

So far, has been explained a method of displaying graphic objects related to the same application to a single page, in case of displaying graphic objects arranged on a plurality of home screen pages to the single page. In the present invention, various information can be provided within a limited space in a more efficient manner.

Figure 10A:
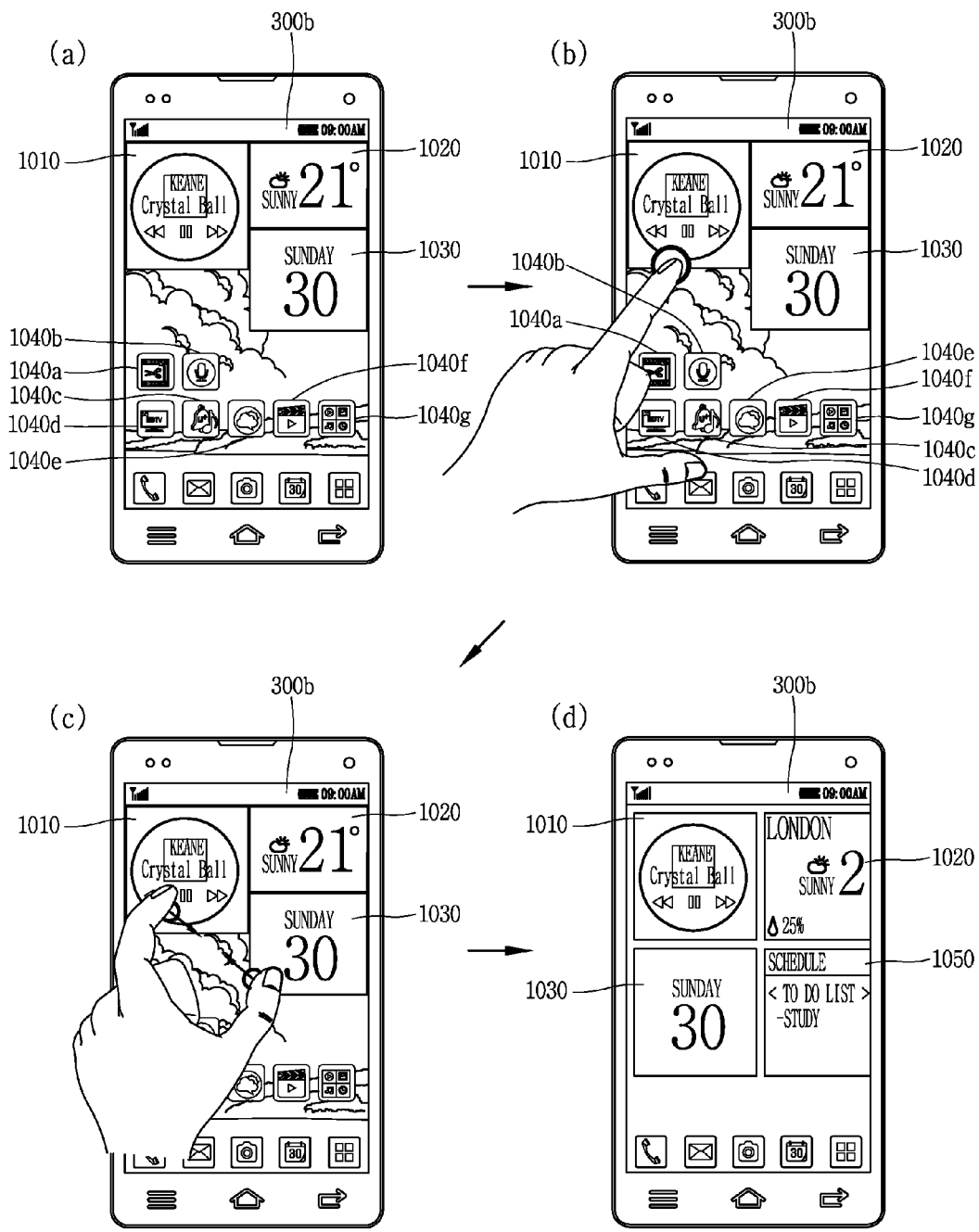
FIGS. 10A, 10B and 10C are conceptual views illustrating a method of detecting graphic objects to be output to a single page from graphic objects arranged on a plurality of home screen pages, in case of displaying the graphic objects arranged on the plurality of home screen pages on the single page based on a preset type of touch.
Figure 10B:
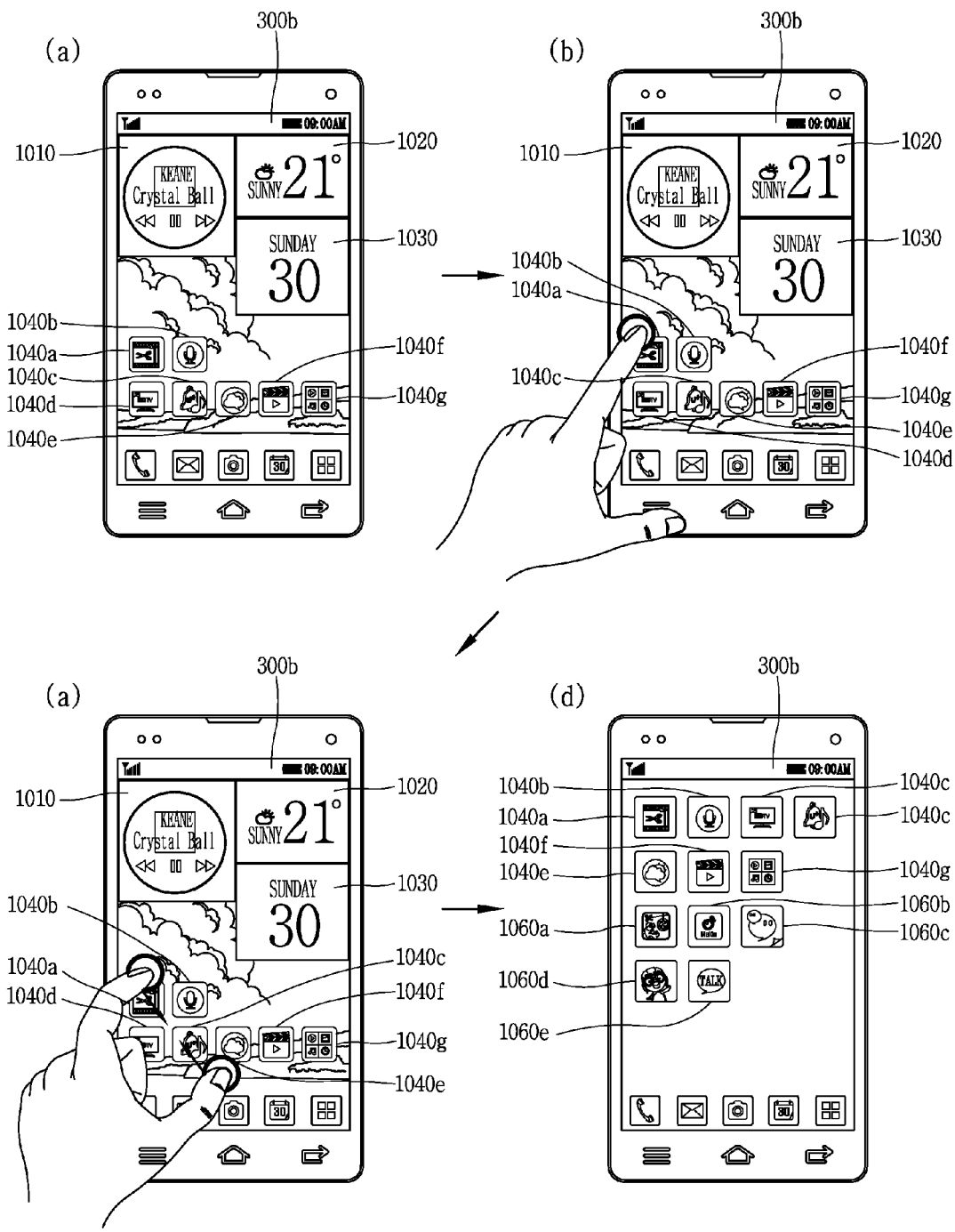

Hereinafter, will be explained a method of detecting graphic objects to be output to a single page from graphic objects arranged on a plurality of home screen pages, in case of displaying the graphic objects arranged on the plurality of home screen pages on the single page based on a preset type of touch. FIGS. 10A and 10B are conceptual views illustrating a method of detecting graphic objects to be output to a single page from graphic objects arranged on a plurality of home screen pages, in case of displaying the graphic objects arranged on the plurality of home screen pages on the single page based on a preset type of touch.

In case of displaying graphic objects arranged on a plurality of home screen pages to a single page in response to a preset type of touch to the display unit 151, the controller 180 detects graphic objects to be output to the single page, from the graphic objects arranged on the plurality of home screen pages. Such detection method will be explained in more detail.

For instance, as shown in FIG. 10A(a), one of a plurality of home screen pages 300*a*, 300*b*, 300*c* (not shown in FIG. 10A) (e.g., 300*b*) may be output to the display unit 151. At least one of widgets 1010, 1020, 1030 and icons 1040*a*, 1040*b*, 1040*c*, 1040*d*, 1040*e*, 1040*f*, 1040*g* may be arranged on the home screen page 300*b*.

In a state where said one home screen page 300*b* has been output to the display unit 151, the controller 180 may sense input of a preset type of touch. The preset type of touch may be at least two touches sensed in a sequential manner. More specifically, the preset type of touch may be a first touch and a second touch sensed in a sequential manner. Said at least two touches may be touches sensed at different regions. Alternatively, said at least two touches may be touches sensed at the same time.

For instance, as shown in FIG. 10A(b), the controller 180 may sense input of a first touch to the display unit 151. Then as shown in FIG. 10A(c), the controller 180 may sense input of a second touch while the first touch is maintained. The controller 180 may sense simultaneous movement of touch points to which the first and second touches have been applied. In this case, the controller 180 may recognize a touch implemented as the touch points are moved together, as a pinch-in touch.

Upon input of the first touch, the controller 180 may detect a type of a graphic object displayed on a region to which the first touch has been applied. For instance, as shown in FIG. 10A(b), the controller 180 may detect that a graphic object displayed on a region to which the first touch has been applied is a widget 1010.

In this case, the controller 180 may display, on a single page, graphic objects 1020, 1030 having the same type as the detected graphic object 1010. For instance, as shown in FIG. 10A(d), the controller 180 may output, to the single page 300*b*, only widgets 1010, 1020, 1030, 1050 among graphic objects arranged on a plurality of home screen pages 300*a*, 300*b*, 300*c* (not shown in FIG. 10A).

As shown in FIG. 10B(b), the controller 180 may sense that an icon 1040*a* is being output to the region to which the first touch has been applied. In this case, as shown in FIG. 10B(d), the controller 180 may output, to the single page 300*b*, icons 1040*a*, 1040*b*, 1040*c*, 1040*d*, 1040*e*, 1040*f*, 1040*g*, 1060*a*, 1060*b*, 1060*c*, 1060*d*, 1060*e* arranged on the plurality of home screen pages 300*a*, 300*b*, 300*c*.

Under such configuration, a user can view widgets or icons dispersed on a plurality of home screen pages on a single page at a glance.

The controller 180 may determine graphic objects arranged on the other home screen pages 300*a*, 300*c* rather than the currently-displayed home screen page 300*b* among the plurality of home screen pages 300*a*, 300*b*, 300*c* (not shown in FIG. 10B), as graphic objects to be output to the single page. That is, the controller 180 may determine that a user wishes to view, on the single page, graphic objects arranged on the other home screen pages rather than the currently-displayed home screen page.

Figure 10C:
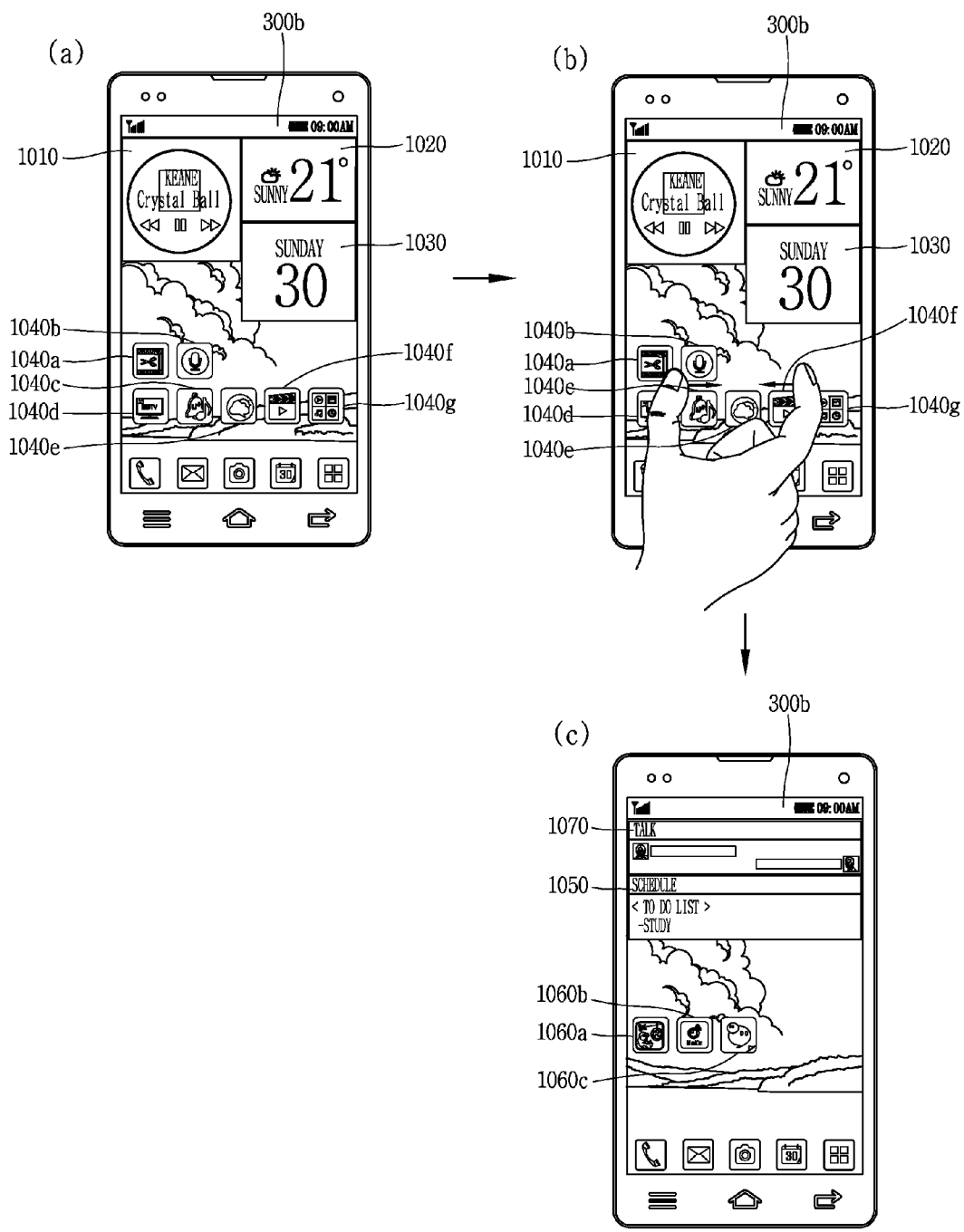

For instance, as shown in FIG. 10C(a), the controller 180 may output at least part of graphic objects arranged on a plurality of home screen pages 300*a*, 300*b*, 300*c* (not shown in FIG. 10C), to a single page, in response to input of a preset type of touch.

As shown in FIG. 10C(c), graphic objects 1050, 1070, 1060*a*, 1060*b*, 1060*c*, 1060*d*, 1060*e* arranged on the other home screen pages 300*a*, 300*c*, not graphic objects 1010, 1020, 1030, 1040*a*, 1040*b*, 1040*c*, 1040*d*, 1040*e*, 1040*f*, 1040*g* arranged on the home screen page 300*b*, among the graphic objects arranged on the plurality of home screen pages 300*a*, 300*b*, 300*c* (not shown in FIG. 10C) may be output to the single page.

Under such configuration, a user can view graphic objects arranged on at least one home screen page different from a currently-displayed home screen page, at a glance, through simple manipulation. That is, a user can view graphic objects arranged on other home screen pages, on a currently-displayed home screen page, without directly entering said other home screen pages.

Hereinafter, will be explained a method of executing a function related to a graphic object, in a state where graphic objects arranged on a plurality of home screen pages have been output to a single page. FIGS. 11A to 11D are conceptual views illustrating a method of executing a function related to a graphic object, in a state where graphic objects arranged on a plurality of home screen pages have been output to a single page.

In a state where graphic objects 1100, 1110, 1120, 1130, 1140, 1150, 1160, 1170 arranged on a plurality of home screen pages have been output to a single page 300*b*, the controller 180 may perform functions related to some of the graphic objects.

Figure 11A:
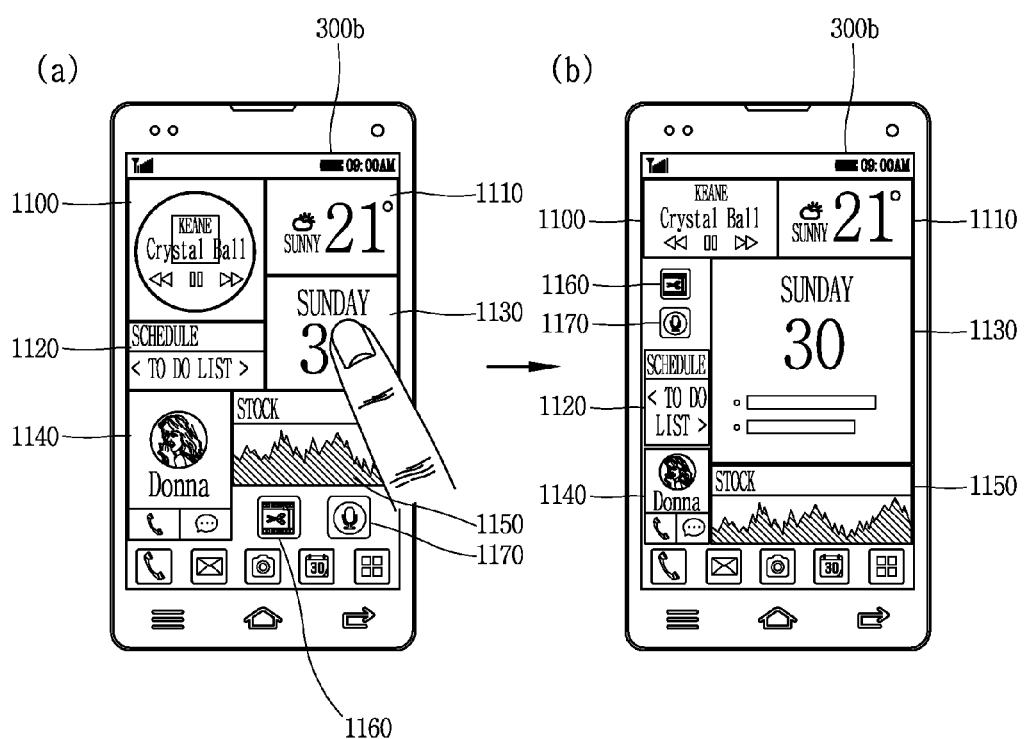
FIGS. 11A to 11D are conceptual views illustrating a method of executing functions related to graphic objects, in a state where the graphic objects arranged on a plurality of home screen pages have been output to a single page.
Figure 11B:
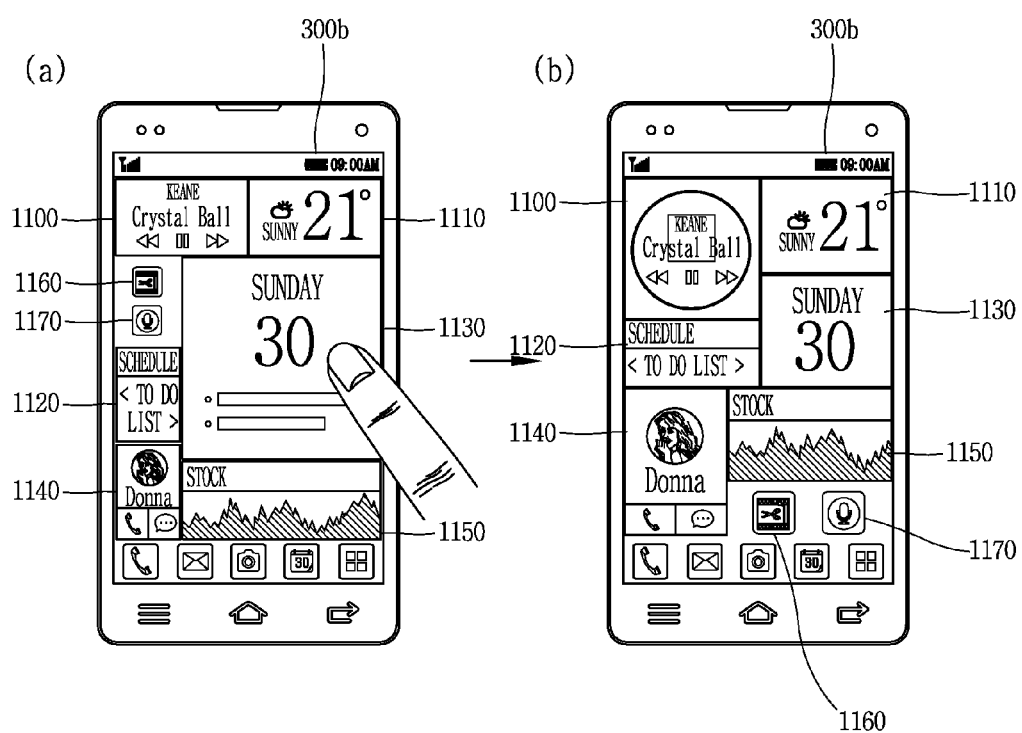

For instance, as shown in FIG. 11A(a), if a touch is applied to one (e.g., 1130) of the graphic objects 1100, 1110, 1120, 1130, 1140, 1150, 1160, 1170 arranged on a single page, the controller 180 may execute a function of the one graphic object 1130.

Upon sensing of the touch to the one graphic object 1130, the controller 180 may execute a function of the one graphic object 1130, and may output the one graphic object 1130 in a larger size than the other graphic objects 1100, 1110, 1120, 1140, 1150, 1160, 1170). That is, the controller 180 may output the other graphic objects 1100, 1110, 1120, 1140, 1150, 1160, 1170 in a relatively smaller size. For instance, as shown in FIG. 11A(b), as the one graphic object 1130 has a relatively larger size, the other graphic objects 1100, 1110, 1120, 1140, 1150, 1160, 1170 may have a relatively smaller size. Under such configuration, a user can check that the one graphic object 1130 is being executed, and can view an execution screen for a function of the one graphic object 1130 in detail.

In a state where the one graphic object 1130 has been output in a relatively larger size, the controller 180 may terminate the current function of the one graphic object 1130, in response to a re-touch to the one graphic object 1130. As shown in FIG. 11A(b), the controller 180 may output the one graphic object 1130 in the original size before the one graphic object 1130 is increased in size. If the one graphic object 1130 is reduced in size, the other graphic objects 1100, 1110, 1120, 1140, 1150, 1160, 1170 differentiated from the one graphic object 1130 may be output in the original size before they are decreased in size.

Upon input of a touch to the one graphic object 1130, the controller 180 may perform a function of the one graphic object 1130, and may output an execution screen 1180 for the function of the one graphic object 1130 to an entire region of the display unit 151.

Figure 11C:
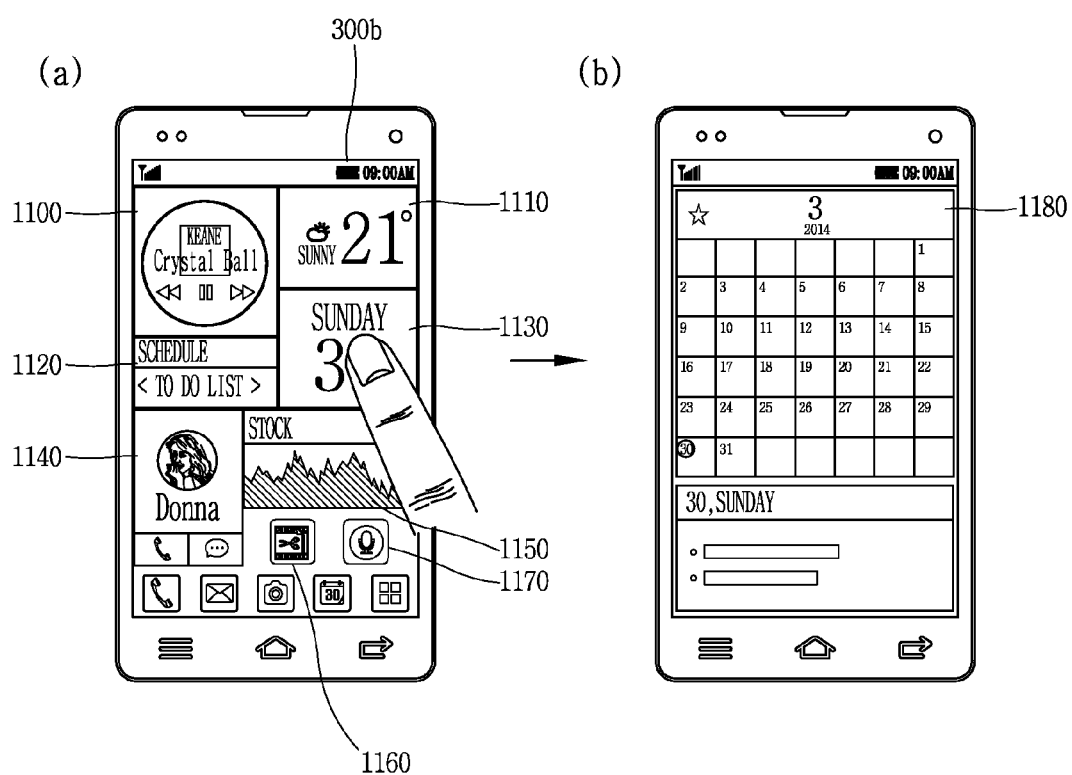

For instance, as shown in FIG. 11C(a), upon selection of the calendar application-related graphic object 1130, the controller 180 may execute a calendar application. Then the controller 180 may output execution screen 1180 indicating a calendar to an entire region of the display unit 151.

In a state where the execution screen 1180 for the function of the one graphic object 1130 has been output to the entire region of the display unit 151, the controller 180 may re-output the single page 300b which had been output prior to the execution screen 1180, according to a user's request.

Figure 11D:
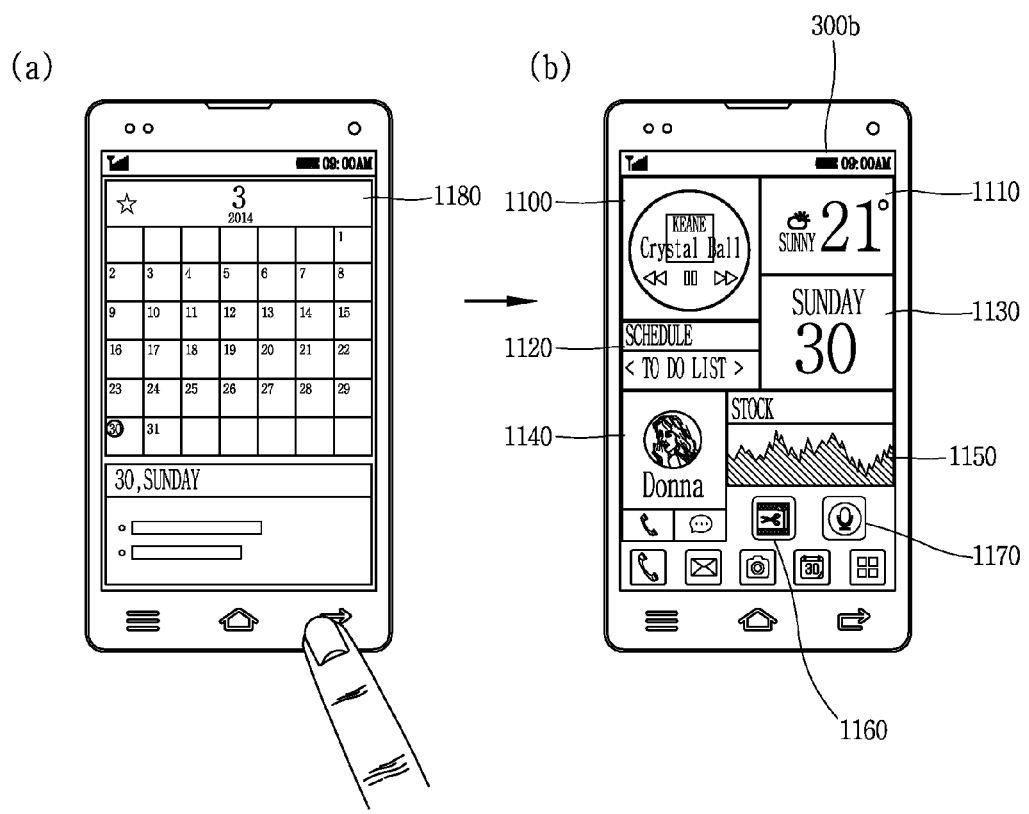
Figure 12:
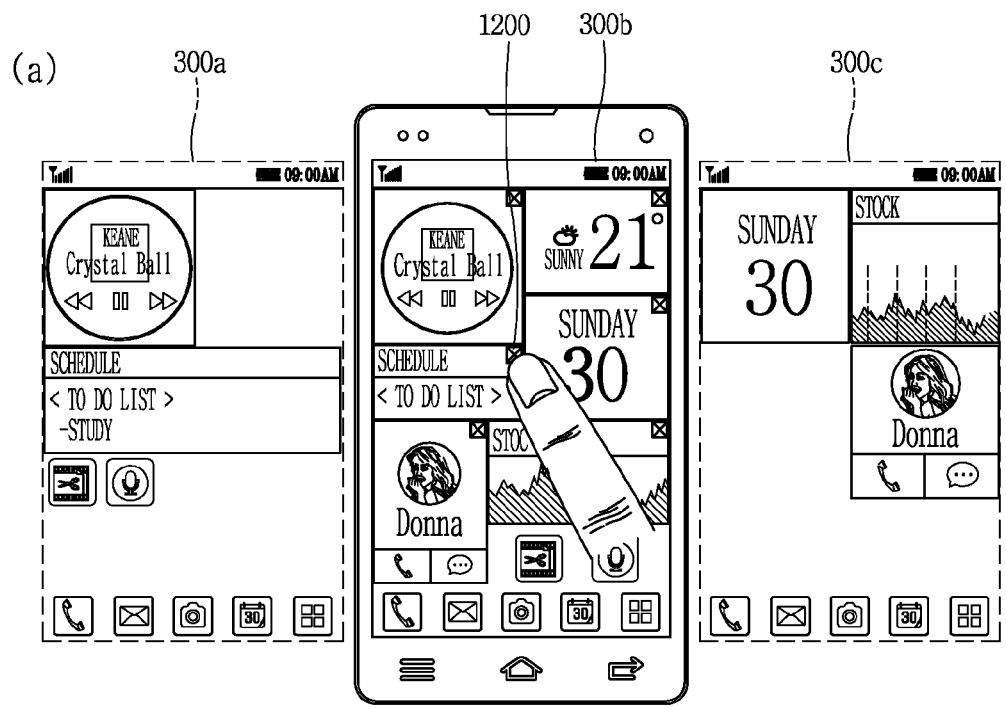
FIGS. 12, 13A, 13B and 13C are conceptual views illustrating that graphic objects are edited on a single page.
Figure 12:
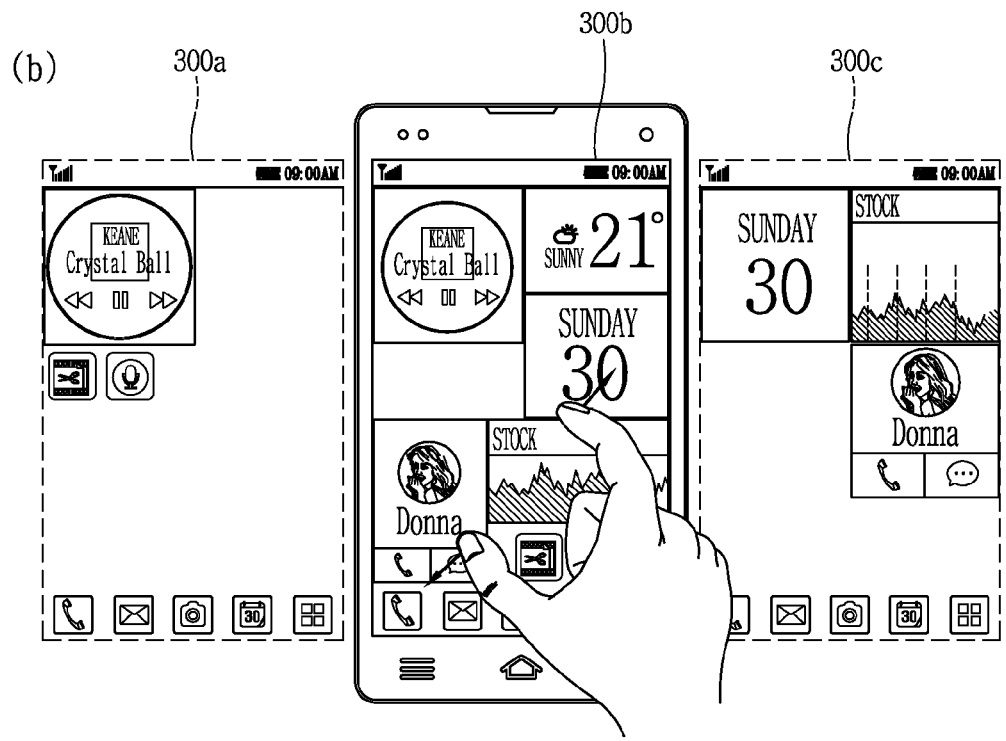

As shown in FIG. 11D(a), the user's request may be a touch to a back key included in the user input unit 123.

Upon receipt of the user's request, the controller 180 may terminate the current function of the one graphic object 1130, and may display the single page. In this case, the controller may display the single page without terminating the current function of the one graphic object 1130.

So far, a method of executing a function related to a graphic object on a single page has been explained. In the present invention, a user can easily perform functions of graphic objects arranged on a plurality of home screen pages, on a single page, without entering home screen pages.

Hereinafter, a method of editing graphic objects on a single page will be explained. FIGS. 12, 13A, 13B and 13C are conceptual views illustrating that graphic objects are edited on a single page.

The controller 180 may edit graphic objects arranged on a plurality of home screen pages, on a single page, according to a user's request. The edition may mean deletion and addition of a graphic object on a home screen page, or change of a display type of a graphic object.

Upon receipt of a user's request for editing graphic objects, the controller 180 may execute an edition mode. In this case, at least one icon for editing graphic objects may be output to one region of each of the graphic objects arranged on the single page. The icon may include a first icon which indicates deletion of a graphic object on a home screen page, and a second icon which indicates addition of a graphic object on a home screen page.

The functions of the first icon and the second ion may be variously changed.

For instance, as shown in FIG. 12(a), a first icon 1200 indicating deletion of a graphic object from a home screen page may be output to one region of each graphic object.

Upon selection of the first icon 1200, the controller 180 may delete a graphic object on which the first icon has been displayed, from the single page. That is, a graphic object, on which the first icon has been displayed, may not be output any longer.

In case of outputting a graphic object to the original home screen page prior to output of the single page, the controller 180 may output the graphic object to the original home screen page in the same state as an edited state on the single page.

For instance, as shown in FIG. 12(b), a graphic object, which has been deleted from the single page, may be also deleted from the original home screen page 300a.

Although not shown, the controller 180 may add a graphic object on the single page. In this case, the controller 180 may arrange the added graphic object on one of a plurality of home screen pages. A home screen page, where the added graphic object is to be arranged, may be selected by a user.

In an edition mode, the controller 180 may edit graphic objects displayed on the single page, according to a position of a touch to the display unit 151.

The display unit 151 may be divided into a plurality of virtual regions. The number of the plurality of virtual regions may be set by a user's selection, or at the time of initial setting of the mobile terminal. For instance, the plurality of virtual regions may be 4 regions having the same size. Hereinafter, 4 virtual regions having the same size and disposed on the upper, lower, right and left sides will be explained. However, the number of the virtual regions may be changed.

Upon input of a touch to the display unit 151, the controller 180 may sense a touch point to which the touch has been input. The controller 180 may edit graphic objects in a differentiated manner, according to a touch point to which the touch has been input.

Figure 13A:
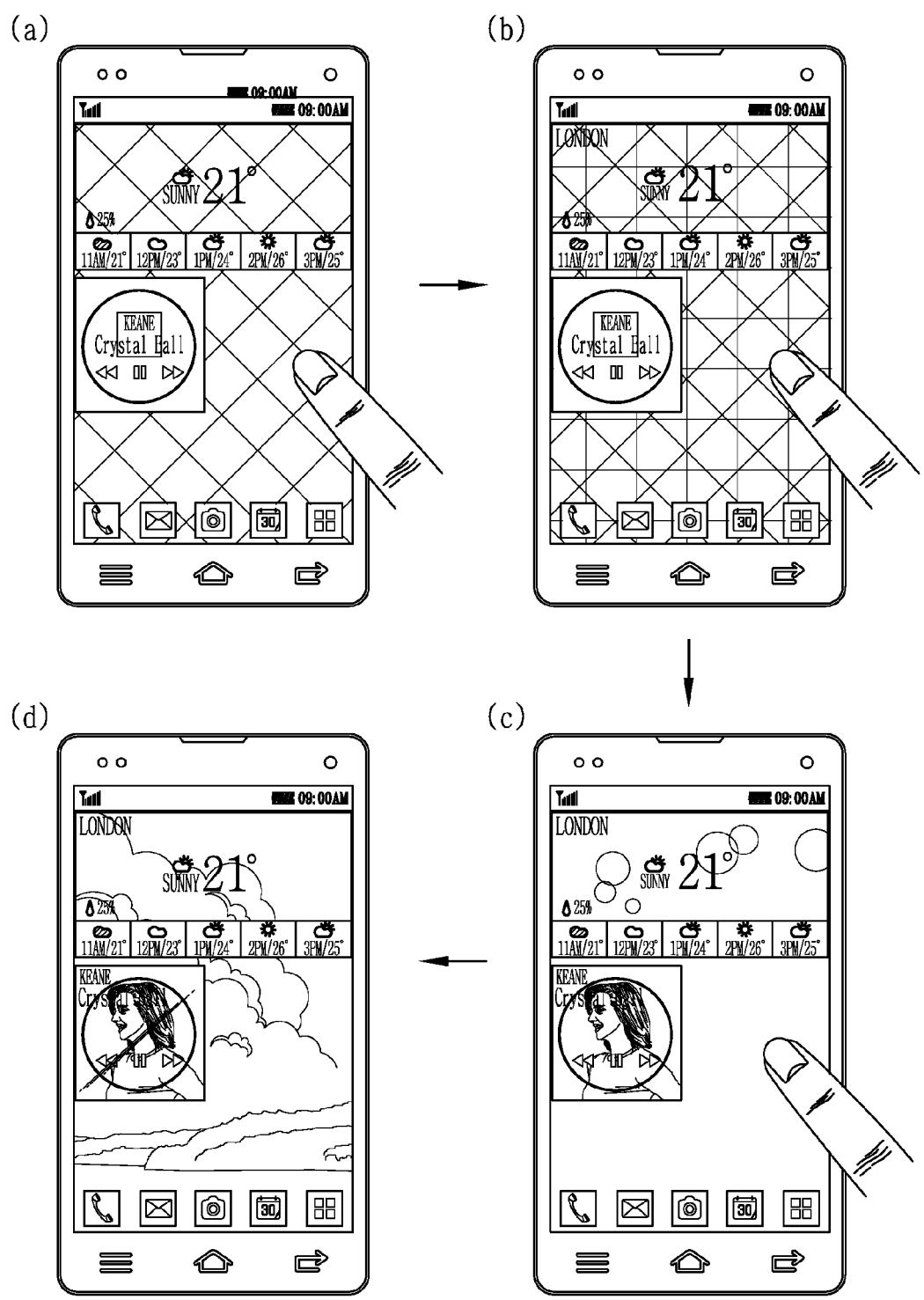

For instance, as shown in FIG. 13A(a), the controller 180 may sense a touch to a right region of the display unit 151 based on a front surface. In this case, as shown in FIG. 13A(b), the controller 180 may control graphic objects output to a single page, to be displayed with higher visibility, in response to the touch input. That is, upon sensing of a touch to the right region of the display unit 151 based on the front surface, the controller 180 may increase visibility of graphic objects output to a single page.

As shown in FIG. 13A(b), upon re-input of a touch to the right region of the display unit 151 based on the front surface, the controller 180 may display the graphic objects more clearly. That is, as shown in FIG. 13A(c), the controller 180 may increase visibility of the graphic objects in correspondence to the number of times that a touch is applied to the right region of the display unit 151 based on the front surface.

Although not shown, if a touch is applied to a left region of the display unit 151 based on the front surface, the controller 180 may display the graphic objects dimly. That is, upon sensing of a touch to the left region of the display unit 151 based on the front surface, the controller 180 may decrease visibility of graphic objects output to a single page.

That is, upon sensing of a touch to an opposite region, the controller 180 may perform an opposite function. As aforementioned, the controller 180 may increase or decease visibility. The opposite function may include various functions as well as the function to increase or decrease visibility.

Figure 13B:
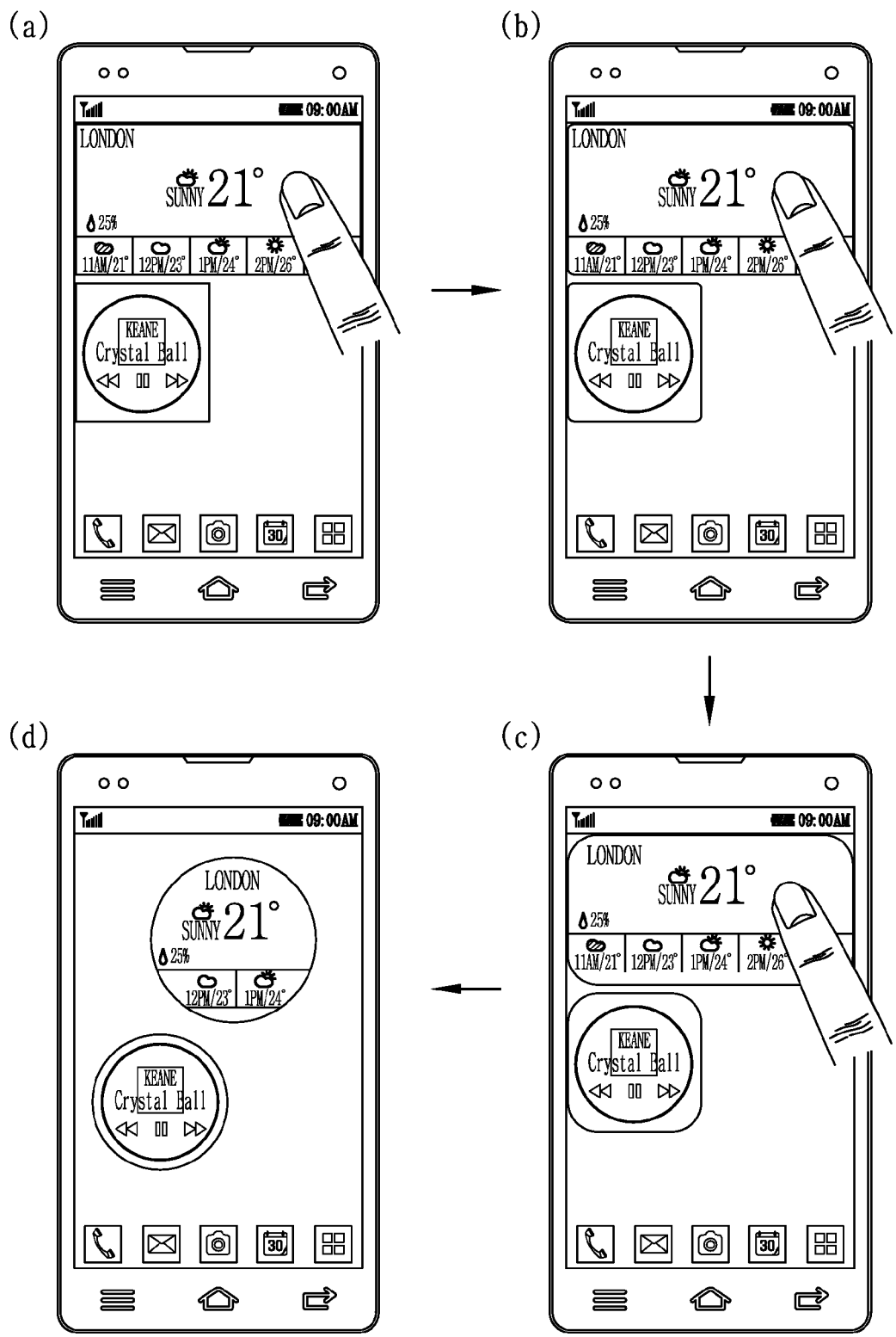

As shown in FIG. 13B(a), the controller 180 may sense a touch to an upper region of the display unit 151 based on the front surface. In this case, the controller 180 may change the shape of the graphic objects into a round shape. For instance, as shown in FIG. 13B(b), the controller 180 may change the shape of the edges of the graphic objects displayed on a single page, into a round shape.

As shown in FIG. 13B(b), the controller 180 may sense re-input of a touch to the upper region of the display unit 151. In this case, as shown in FIG. 13B(c), the controller 180 may change the shape of the edges of the graphic objects into a more rounded shape.

That is, the controller 180 may determine the degree of shape change of the graphic objects, in correspondence to the number of times that touch inputs are applied to the upper region of the display unit 151.

Although not shown, if a touch input is applied to a lower region of the display unit 151, the controller 180 may change the shape of the edges of the graphic objects into a square shape.

That is, the controller 180 may determine the degree of shape change of the graphic objects, based on touch inputs applied to the upper and lower regions of the display unit 151.

The controller 180 may display at least two graphic objects as one graphic object in a synthesizing manner, based on a preset type of touch. That is, the controller 180 may generate a graphic object synthesized from at least two graphic objects. In this case, the synthesized graphic object may have the original functions of the respective graphic objects.

Figure 13C:
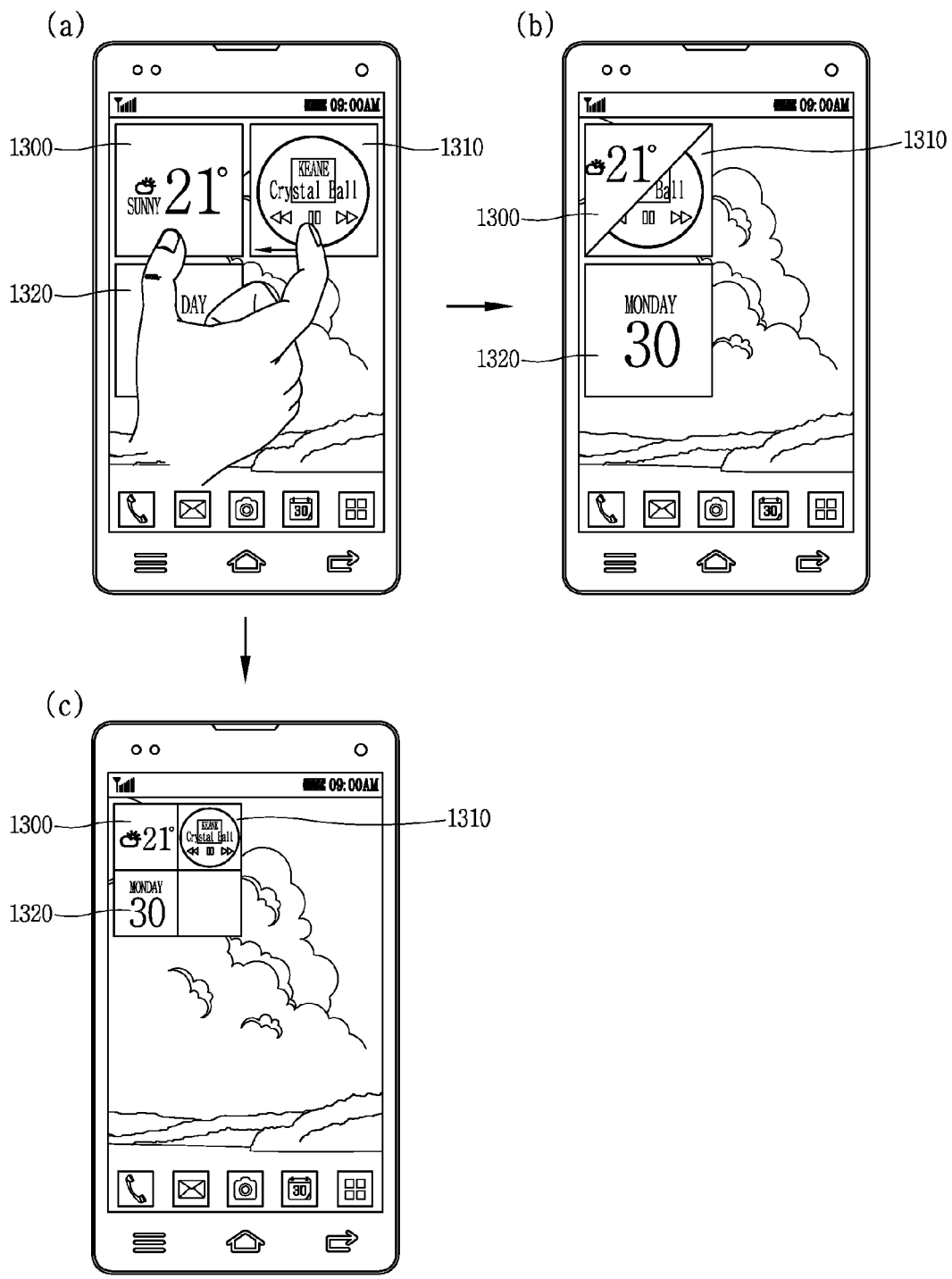

More specifically, as shown in FIG. 13C(a), upon input of a preset type of touch (e.g., pinch-in touch), the controller 180 may synthesize at least two graphic objects 1300, 1310 among graphic objects 1300, 1310, 1320 displayed on a single page.

In this case, as shown in FIG. 13C(b), the controller 180 may display a synthesized graphic object among said at least two graphic objects 1300, 1310, on the single page. The synthesized graphic object may be obtained as said at least two graphic objects 1300, 1310 are partially synthesized with each other. The synthesized graphic object may have the original functions of applications related to said at least two graphic objects 1300, 1310.

As shown in FIG. 13C(c), the controller 180 may display a synthesized graphic object among all the graphic objects 1300, 1310, 1310 displayed on the single page. The synthesized graphic object may have the original functions of applications related to all of the graphic objects 1300, 1310, 1310.

Under such configuration, a user can efficiently display a plurality of graphic objects on a limited region.

So far, a method of editing graphic objects on a single page has been explained. The present invention may provide a method of editing graphic objects dispersed on a plurality of home screen pages, without directly entering each of the plurality of home screen pages.

Figure 14A:
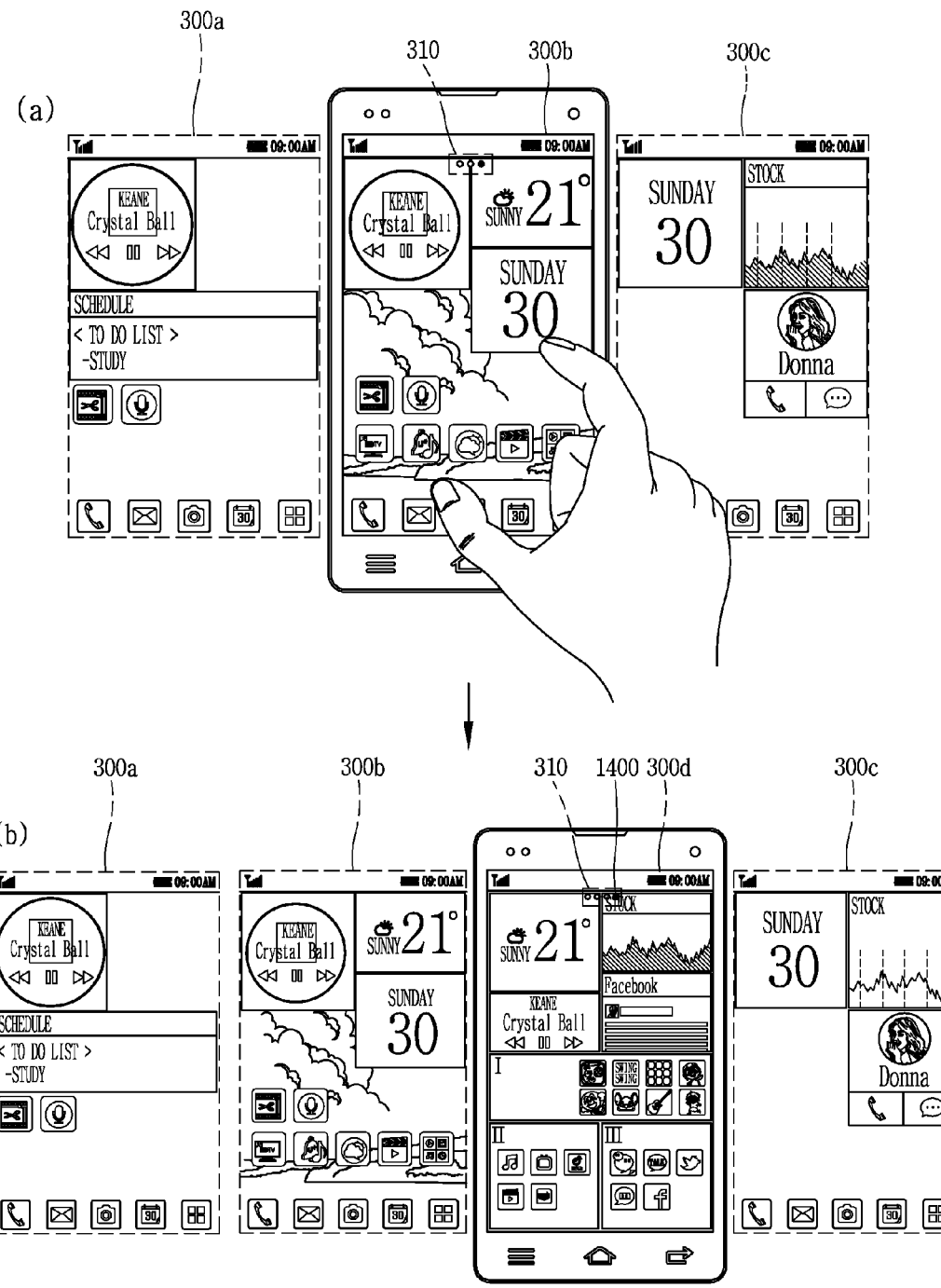
FIGS. 14A and 14B are conceptual views for explaining a control method when the single page is a new page.
Figure 14B:
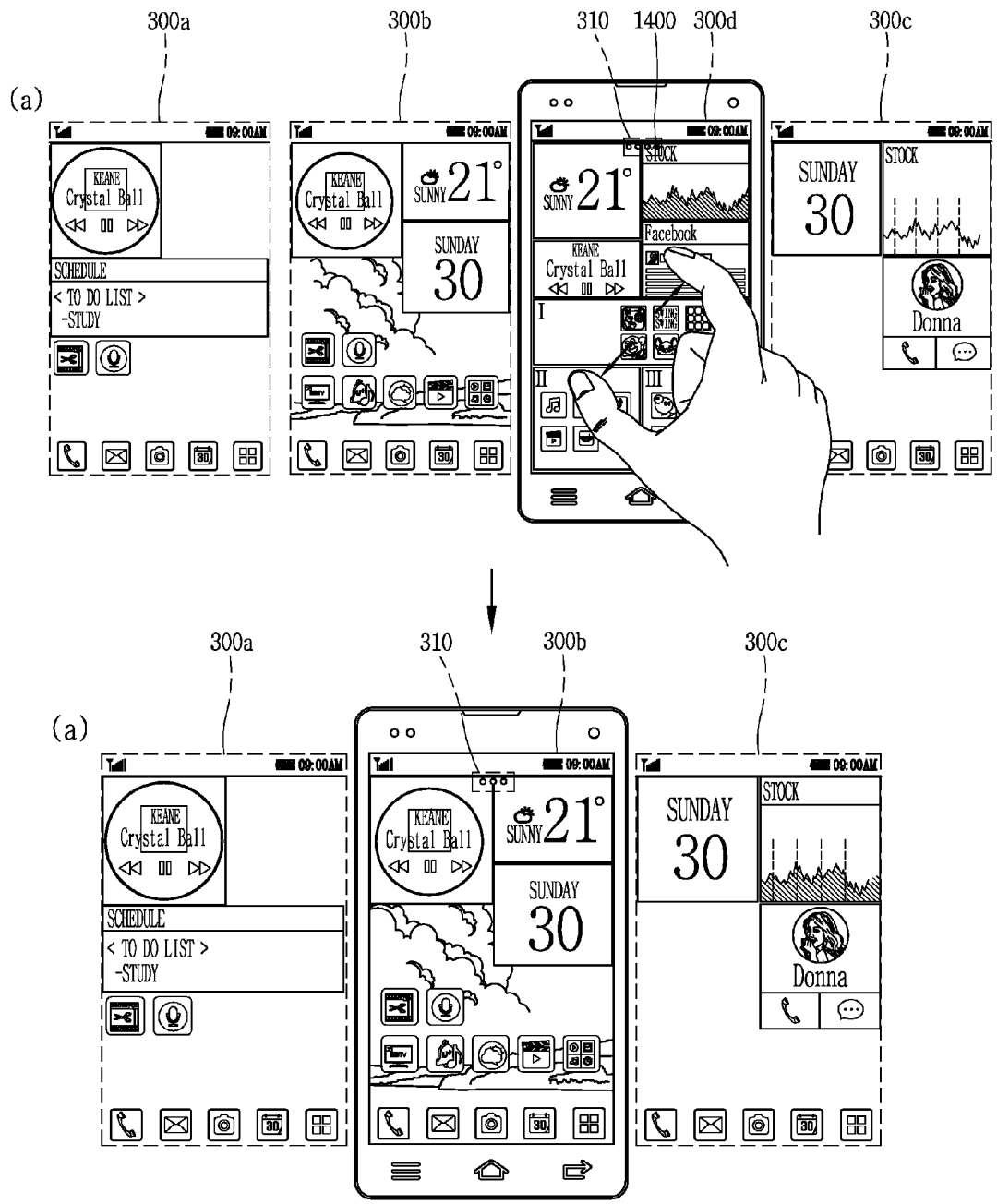

Hereinafter, a case where the single page is a new page will be explained in more detail. FIGS. 14A and 14B are conceptual views for explaining a control method when the single page is a new page.

Upon input of a preset type of touch, the controller 180 may output graphic objects arranged on a plurality of home screen pages 300a, 300b, 300c, to a single page.

The single page may be the home screen page 300b which has been output to the display unit 151 before the preset type of touch is applied. However, the single page may be a new page 300d different from the plurality of home screen pages 300a, 300b, 300c.

The new page 300d may be a page on which graphic objects are displayable. The new page 300d may be a page newly generated upon receipt of a control command for displaying graphic objects arranged on the plurality of home screen pages on a single page.

As shown in FIG. 14A(a), upon input of a preset type of touch, the controller 180 may generate a new page 300d for outputting graphic objects arranged on the plurality of home screen pages 300a, 300b, 300c.

As shown in FIG. 14A(b), the controller 180 may output, to the new page 300d, the graphic objects arranged on the plurality of home screen pages 300a, 300b, 300c, in response to the preset type of touch.

In the case where the graphic objects have been output to the new page 300d, the controller 180 may output, to one region of the display unit 151, notification information indicating generation of the new page 300d.

For instance, as shown in FIG. 14A(b), the controller 180 may output notification information 1400 indicating addition of the new page 300d, to a region 310 where information on the order of the home screen pages currently-displayed on the display unit 151 has been output.

The new page 300d may be a page which is deleted upon receipt of a control command instructing that the graphic objects arranged on the new page 300d should be re-arranged on the original home screen pages. That is, the new page 300d may be a page which is temporarily generated to be deleted according to a user's request.

For instance, as shown in FIG. 14B(a), if a preset type of touch is applied to the display unit 151 in a state where the new page 300d has been displayed on the display unit 151, the controller 180 may output one home screen page 300b which has been output to the display unit 151 prior to output of the new page 300d.

As shown in FIG. 14B(b), the controller 180 may delete the new page 300d. In this case, notification information 1400 notifying existence of the new page may not be output to the region 310 any longer, the region 310 to which information on the order of the home screen pages currently-displayed on the display unit 151 has been output. Accordingly, a user may check that the new page 300d has been deleted.

So far, it has been explained about a page on which graphic objects arranged on a plurality of home screen pages are displayed. The present invention may be also applicable to a case where graphic objects are displayed on the new page 300d, in the same manner as in the case where graphic objects are displayed on one home screen page 300b.

Figure 15:
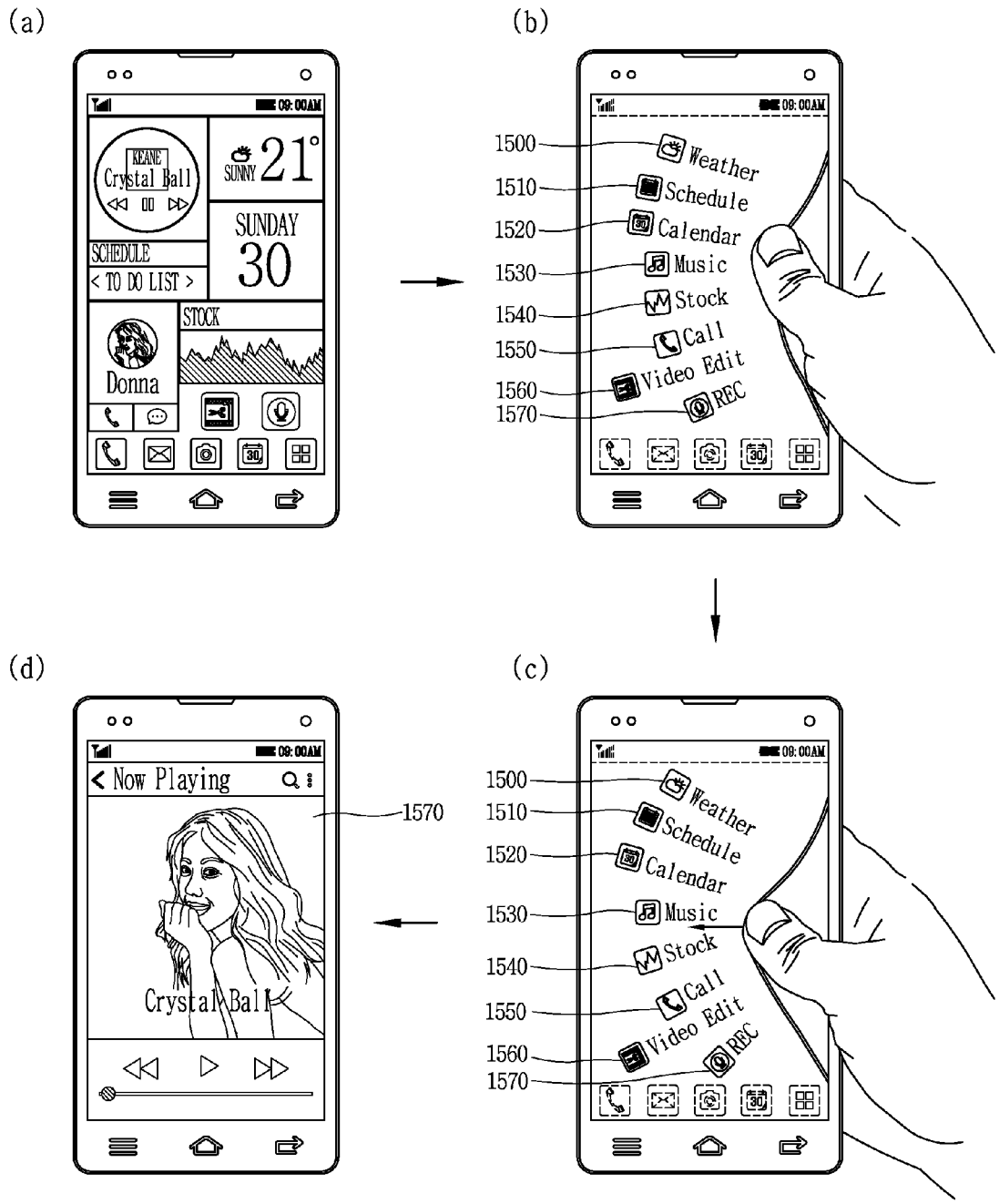
FIG. 15 is a conceptual view illustrating a method of easily executing an application using a preset type of touch.

Hereinafter, will be explained a method of easily executing applications using a preset type of touch. FIG. 15 is a conceptual view illustrating a method of easily executing an application using a preset type of touch.

The controller 180 may output a list of applications, in response to a preset type of touch, in a state where graphic objects arranged on a plurality of home screen pages 300a, 300b, 300c have been output to a single page.

The controller 180 may output a list of applications, in response to a preset type of touch, in a state where one of the plurality of home screen pages 300a, 300b, 300c (e.g., 300b) has been output.

Hereinafter, will be explained a case where a preset type of touch is applied in a state where graphic objects arranged on the plurality of home screen pages 300a, 300b, 300c have been output to a single page. However, the present invention is not limited to this. That is, the present invention may be also applicable to a case where a general home screen page (e.g., 300a) has been output.

Once a preset type of touch is applied to the display unit 151, the controller 180 may output a list of applications including at least one application item 1500, 1510, 1520, 1530, 1540, 1550, 1560, to a region adjacent to the touch-applied region.

The preset type of touch may be a drag touch starting from the left side or the right side based on a front surface of the mobile terminal, which may be sensed by a bezel sensor. For instance, as shown in FIG. 15(*a*), the controller 180 may sense a drag touch starting from the left side using a bezel sensor.

The list of applications may be displayed on a region adjacent to a touch-sensed region. That is, upon sensing of a touch input by a right bezel sensor, the controller 180 may output a list of applications to a right region of the display unit 151. On the other hand, upon sensing of a touch input by a left bezel sensor, the controller 180 may output a list of applications to a left region of the display unit 151. For instance, as shown in FIGS. 15(*a*) and 15(*b*), if a drag input starting from a touch input is sensed by the right bezel sensor, the controller 180 may output a list of applications to a right region of the display unit 151. Under such configuration, a user's inconvenience in using two hands due to a large size of the display unit 151 can be solved.

Application items included in the list of applications may be one or more of a plurality of applications installed at the mobile terminal. Said one or more applications may be set by a user's selection or according to a preset condition.

The preset condition may be an application set by a user's frequency of usage, or an application currently-displayed on the display unit 151. For instance, the application items 1500, 1510, 1520, 1530, 1540, 1550, 1560 included in the list of applications may be applications having a high frequency of usage at a time zone when a preset type of touch has been applied.

An output order of the application items 1500, 1510, 1520, 1530, 1540, 1550, 1560 included in the list of applications may be determined according to a frequency of usage. For instance, an application having a highest frequency of usage may be output to a region closest to a touch-applied region, whereas an application having a relatively lower frequency of usage may be output to a region far from a touch-applied region. Under such configuration, a user can be provided with an optimized function. As another example, the application items 1500, 1510, 1520, 1530, 1540, 1550, 1560 may be sequentially output from the upper side to the lower side, according to higher frequency of usage.

That is, upon sensing of a touch input by the bezel sensor, the controller 180 may detect a frequency of usage of applications, and may sequentially output items of the applications according to the frequency of usage.

Then if a drag input starting from the touch input is toward one of the plurality of application items included in the list of applications (e.g., 1530), the controller 180 may perform a function related to the application 1530. An execution screen of the application 1530 may be output to the display unit 151. For instance, as shown in FIG. 15(*c*), a drag input is applied to one application (e.g., 1530) among the plurality of application items 1500, 1510, 1520, 1530, 1540, 1550, 1560, the controller 180 may execute the application 1530. As shown in FIG. 15(*d*), an execution screen of the application 1530 may be output to the display unit 151.

So far, a method of easily executing applications using one hand has been explained. According to the method, a user can easily execute his or her desired application even in a situation where the user has a difficulty in using two hands.

The present invention may provide a function which allows a user to view graphic objects dispersed on a plurality of home screen pages at a glance, by outputting the graphic objects arranged on the plurality of home screen pages to a single page. Accordingly, a user can search for his or her desired graphic object through simple manipulation, without directly entering a home screen page where the desired graphic object has been displayed.

The present invention may also provide a method capable of displaying graphic objects arranged on a plurality of home screen pages on a single page, and capable of editing the graphic objects on the single page. Accordingly, a user can edit graphic objects arranged on a plurality of home screen pages at one time, in a style of the same theme.

Further preferred embodiments will be described in more detail with reference to additional drawing figures. It is understood by those skilled in the art that the present features can be embodied in several forms without departing from the characteristics thereof.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a touchscreen; and
    a controller configured to:
        cause the touchscreen to display a first home screen page among a plurality of home screen pages, wherein each of the plurality of home screen pages includes a plurality of graphic objects, and each of the plurality of graphic objects comprises different types of graphic objects;
        receive a first touch input applied to a specific area of the first home screen page while the first home screen page is displayed;

determine a type of one graphic object displayed on the specific area as an icon type or a widget type in response to the first touch input;

extract at least one graphic object among the plurality of graphic objects included in the plurality of home screen pages based on the determined type of one graphic object; and cause the touchscreen to display the extracted at least one graphic object on a single screen page, wherein the extracted at least one graphic object is a same type as the determined type of one graphic object, wherein the single screen page is different from each of the plurality of home screen pages, wherein when the determined type of one graphic object is the icon type, the single screen page includes at least one icon type graphic object included in the plurality of home screen pages and the single screen page does not include any widget type graphic objects included in the plurality of home screen pages, wherein when the determined type of one graphic object is the widget type, the single screen page includes at least one widget type graphic object included in the plurality of home screen pages and the single screen page does not include any icon type graphic objects included in the plurality of home screen pages, and wherein the at least one widget type graphic object included in the single screen page includes the one graphic object displayed on the specific area of the first home screen page and at least one widget type graphic object that was not included in the first home screen page when the determined type of one graphic object is the widget type.

2. The mobile terminal of claim 1, wherein the controller is further configured to cause the touchscreen to redisplay the first home screen page in response to a second touch input that is applied to the touchscreen on which the single screen page is displayed.

3. The mobile terminal of claim 1, wherein:
the controller is further configured to cause the touchscreen to display options in response to a user input received prior to the first touch input, the options comprising a first option for displaying thumbnail images, each of the thumbnail images representing a respectively corresponding one of the plurality of home screen pages, and a second option for displaying the single screen page; and
the first touch input is for selecting the second option.

4. The mobile terminal of claim 3, wherein the controller is further configured to cause the touchscreen to display an icon for switching between displaying the single screen page and displaying the thumbnail images such that the thumbnail images are displayed in response to selection of the icon while the extracted at least one graphic object is displayed on the single screen page.

5. The mobile terminal of claim 1, wherein the at least one icon type graphic object displayed on the single screen page or the at least one widget type graphic object displayed on the single screen page have different sizes, the sizes adjusted based on a preset condition.

6. The mobile terminal of claim 5, wherein the preset condition is determined according to a usage pattern of each of the at least one icon type graphic object or widget type graphic object.

7. The mobile terminal of claim 5, wherein the preset condition is time of a day, and a size of each of the at least one icon type graphic object or widget type graphic object is determined based on time when the first touch input is applied to the touchscreen.

8. The mobile terminal of claim 5, wherein:
the preset condition is attribute information of the graphic objects; and
the controller is further configured to determine sizes of the graphic objects according to the attribute information.

9. The mobile terminal of claim 1, wherein:
the first touch input comprises a pinch-in that is received via two different graphic objects of a same type included in the first home screen page; and
the controller is further configured to cause the touchscreen to display progressive shifting of the at least one icon type graphic object or widget type graphic object onto the single screen page during the pinch-in.

10. The mobile terminal of claim 1, wherein the controller is further configured to activate an edit mode, in which a display type of the at least one icon type graphic object or widget type graphic object is changeable, in response to a user input that is received while the single screen page is displayed.

11. The mobile terminal of claim 10, wherein in response to a second touch input that is applied to the touchscreen during the edit mode, the controller is further configured to:
change the display type of the at least one icon type graphic object or widget type graphic object into a first type when the second touch input is applied to a first region of the single screen page; and
change the display type of the at least one icon type graphic object or widget type graphic object into a second type when the second touch input is applied to a second region of the single screen page that is different from the first region.

12. The mobile terminal of claim 10, wherein an arrangement of graphic objects on the redisplayed first home screen page is changed according to the change of the display type of the at least one icon type graphic object or widget type graphic object on the single screen page.

13. The mobile terminal of claim 1, wherein:
the at least one widget provides real-time information that is changeable from time to time; and
the at least one icon provides a fixed image that always includes same information.

14. A method of controlling a mobile terminal comprising a touchscreen, the method comprising:
displaying, on the touchscreen, a first home screen page among a plurality of home screen pages, wherein each of the plurality of home screen pages includes a plurality of graphic objects, and each of the plurality of graphic objects comprises different types of graphic objects;
receiving a first touch input applied to a specific area of the first home screen page while the first home screen page is displayed;
determining a type of one graphic object displayed on the specific area as an icon type or a widget type in response to the first touch input;
extracting at least one graphic object among the plurality of graphic objects included in the plurality of home screen pages based on the determined type of one graphic object; and
displaying, on the touchscreen, the extracted at least one graphic object on a single screen page, wherein the extracted at least one graphic object is a same type as the determined type of one graphic object, wherein the single screen page is different from each of the plurality of home screen pages, wherein when the determined type of one graphic object is the icon type, the single screen page includes at least one icon type graphic object included in the plurality of home screen pages and the single screen page does not include any widget type graphic objects included in the plurality of home screen pages, and wherein when the determined type of one graphic object is the widget type, the single screen page includes at least one widget type graphic object included in the plurality of home screen pages and the single screen page does not include any icon type graphic objects included in the plurality of home screen pages, wherein the at least one widget type graphic object included in the single screen page includes the one graphic object displayed on the specific area of the first home screen page and at least one widget type graphic object that was not included in the first home screen page when the determined type of one graphic object is the widget type.

15. The method of claim 14, further comprising redisplaying the first home screen page in response to a second touch input that is applied to the touchscreen while the single screen page is displayed.

* * * * *